(12) United States Patent
Lindenmuth et al.

(10) Patent No.: US 11,485,872 B2
(45) Date of Patent: Nov. 1, 2022

(54) AQUEOUS BASED BLEND COMPOSITION AND METHOD OF PRODUCING THE SAME

(71) Applicants: Dow Global Technologies LLC, Midland, MI (US); Rohm and Haas Company, Philadelphia, PA (US)

(72) Inventors: Denise Lindenmuth, Ambler, PA (US); Joceyln Gruver, North Wales, PA (US); Ann R. Hermes, Ambler, PA (US); Ray E. Drumright, Midland, MI (US)

(73) Assignees: Dow Global Technologies LLC, Midland, MI (US); Rohm and Haas Company, Philadelphia, PA (US)

(*) Notice: Subject to any disclaimer, the term of this patent is extended or adjusted under 35 U.S.C. 154(b) by 648 days.

(21) Appl. No.: 14/404,675

(22) PCT Filed: May 16, 2013

(86) PCT No.: PCT/US2013/041312
§ 371 (c)(1),
(2) Date: Dec. 1, 2014

(87) PCT Pub. No.: WO2013/191825
PCT Pub. Date: Dec. 27, 2013

(65) Prior Publication Data
US 2015/0147502 A1 May 28, 2015

Related U.S. Application Data

(60) Provisional application No. 61/661,395, filed on Jun. 19, 2012.

(51) Int. Cl.
| | | |
|---|---|---|
| *C09D 133/08* | (2006.01) | |
| *C08L 23/02* | (2006.01) | |
| *C09J 123/10* | (2006.01) | |
| *C08L 23/10* | (2006.01) | |
| *C08L 33/10* | (2006.01) | |
| *C08J 3/05* | (2006.01) | |
| *C09D 123/12* | (2006.01) | |
| *C08L 23/08* | (2006.01) | |

(52) U.S. Cl.
CPC ............ *C09D 133/08* (2013.01); *C08J 3/05* (2013.01); *C08L 23/02* (2013.01); *C08L 23/10* (2013.01); *C08L 33/10* (2013.01); *C09D 123/12* (2013.01); *C09J 123/10* (2013.01); *C08J 2323/12* (2013.01); *C08J 2333/08* (2013.01); *C08J 2423/12* (2013.01); *C08J 2433/08* (2013.01); *C08L 23/0869* (2013.01); *C08L 2201/54* (2013.01); *C08L 2205/02* (2013.01); *C08L 2205/025* (2013.01); *Y10T 428/1352* (2015.01)

(58) Field of Classification Search
CPC .......... C08L 23/10; C08L 23/12; C08L 23/16; C08L 2201/54; C08L 23/142; C08L 33/08; C08L 33/10; C08L 33/12; C08D 123/10; C08D 123/12; C08D 123/16; C08D 133/08; C08D 133/10; C09D 123/142; C09D 133/12
See application file for complete search history.

(56) References Cited

U.S. PATENT DOCUMENTS

| | | | |
|---|---|---|---|
| 5,504,172 A | 4/1996 | Imuta et al. | |
| 6,194,514 B1 * | 2/2001 | Scheuermann | C08F 265/06 524/558 |
| 6,525,157 B2 | 2/2003 | Cozewith et al. | |
| 6,960,635 B2 | 11/2005 | Stevens et al. | |
| 7,528,080 B2 * | 5/2009 | Prieto | A43B 1/00 442/103 |
| 2003/0044626 A1 * | 3/2003 | Kim | C09D 133/10 428/483 |
| 2005/0271888 A1 * | 12/2005 | Moncla | C08J 7/047 428/523 |
| 2006/0199930 A1 | 9/2006 | Li Pi Shan et al. | |

FOREIGN PATENT DOCUMENTS

| | | | |
|---|---|---|---|
| CN | 101475661 | 7/2009 | |
| CN | 101787098 | 7/2010 | |
| EP | 1970418 | 9/2008 | |
| EP | 1970419 | 9/2008 | |
| JP | 11071548 | 3/1999 | |
| JP | 2008201882 | 9/2008 | |
| WO | 0001745 | 1/2000 | |
| WO | 2005090427 | 9/2005 | |
| WO | WO2007078536 | 7/2007 | |
| WO | WO-2011011705 A2 * | 1/2011 | ............ B65D 25/14 |
| WO | WO2012087070 | 6/2012 | |
| WO | 2013059165 | 4/2013 | |

OTHER PUBLICATIONS

CN 101787098 Machine Translation.*
(Continued)

*Primary Examiner* — Zachary M Davis

(57) ABSTRACT

The instant invention is an aqueous based blend composition and method of producing the same. The aqueous based blend composition comprises (a) an aqueous polyolefin dispersion comprising the melt blending product of one or more base polymers and one or more stabilizing agents in the presence of water and optionally one or more neutralizing agents, wherein the polyolefin dispersion has an average volume particle size diameter in the range of from 400 to 1500 nm; and a pH range from 8 to 11; and (b) an acrylic emulsion acrylic solids having an average weight particle size diameter in the range of from 75 to 450 nm; an acid level in the range of from 0.25 to 5 percent by weight of acid monomers based on the weight of the acrylic monomer, and a weight average molecular weight in the range of from 200,000 to 5,000,000 g/mole, and a glass transition temperature ($T_g$) in the range of from 7 to 100° C., wherein said acrylic emulsion has a pH in the range of from 7 to 11; wherein said aqueous based blend composition has a solid content in the range of from 15 to 70 percent by weight of solids, based on the weight of the aqueous based blend composition, and a pH in the range of from 7 to 11.

5 Claims, No Drawings

(56) References Cited

OTHER PUBLICATIONS

Utracki, Glass Transition Temperatures in Polymer Blends, Advances in Polymer Technology, 1985, vol. 5, Issue 1, pp. 33-39.*
Machine Translation of JP 2008-201882 (Year: 2008).*
Machine Translation of JP H11-071548 (Year: 1999).*
EP Office Action dated Jan. 30, 2015; from EP counterpart Application No. 13726943.7.
EP Response to Office Action dated Jul. 23, 2015; from EP counterpart Application No. 13726943.7.
Chinese Response to Office Action dated Jul. 12, 2016; from Chinese counterpart Application No. 201380041419.5.
Chinese Office Action dated Oct. 24, 2016; from Chinese counterpart Application No. 201380041419.5.
Chinese Response Office Action dated Dec. 5, 2016; from counterpart Chinese Application No. 201380041419.5.
Japanese Office Action dated Feb. 6, 2017; from Japanese counterpart Application No. 2015-518407.
Chinese Office Action dated Mar. 29, 2017; from Chinese counterpart Application No. 201380041419.5.
PCT/US2013/041312 International Search Report dated Aug. 8, 2013, 4 pages.
PCT/US2013/041312 Written Opinion of the International Preliminary Examining Authority dated Sep. 15, 2014, 15 pages.
Japanese Office Action dated Sep. 21, 2017; from counterpart Japanese Application No. 2015-518407.
Chinese Office Action received May 14, 2018; from counterpart Chinese Application No. 201380041419.5.
Brazilian Office Action dated Dec. 11, 2019; from counterpart Brazilian Application No. BR 11 2014 029685 5.

* cited by examiner

AQUEOUS BASED BLEND COMPOSITION AND METHOD OF PRODUCING THE SAME

REFERENCE TO RELATED APPLICATIONS

The present application claims the benefit of U.S. Provisional Application No. 61/661,395, filed on Jun. 19, 2012.

FIELD OF INVENTION

The instant invention relates to an aqueous based blend composition and method of producing the same.

BACKGROUND OF THE INVENTION

The application of various treatment and pretreatment solutions to metal substrates to retard or inhibit corrosion is well known. This is particularly true in the area of metal food and/or beverage containers, e.g. cans, as well as non-food metal containers. Coatings are typically applied to the interior surface of such containers to prevent the contents from contacting the metal parts of the container. Contact between the metal surface and the food and/or beverage as well as non-food substances can lead to corrosion of the metal container, which can then contaminate the contents thereof. Corrosion is particularly problematic when food and/or beverage products are highly acidic in nature or contain a high salt content such as a rhubarb-based products or isotonic drinks. Highly alkaline contents of non-food substances such as hair-dye may also react with metal, for example, aluminum, parts of containers. The coatings applied, for example, to the interior of food and/or beverage cans also help prevent corrosion in the head space of the cans, the area between the fill line of the food product and the can lid. The coatings may be applied to the outside of metal containers to provide protection against the external environment and/or to provide a decorative layer including fillers and/or pigments. In addition to corrosion protection, coatings for food and/or beverage cans should be non-toxic and inert, and, if applied to the internal surface, should not adversely affect the taste or appearance, e.g. color, of the food and/or beverage in the can or contribute to a contamination of such contents. Resistance to "popping", "blushing" and/or "blistering" is also desired. Certain coatings are particularly applicable for application onto coiled metal stock, such as the coiled metal stock from which the ends of cans are made, "can end stock" and valve cups, e.g. top ends of aerosol cans. Since coatings designed for use on can end stock are applied prior to the ends being cut and stamped out of the coiled metal stock, they are also typically flexible and/or extensible. Such can end stock is typically coated on both sides. Thereafter, the coated metal stock is punched and may be beaded or bent. It may also be scored for the "pop-top" opening and the pop-top ring is then attached with a pin that is separately fabricated. The end is then attached to the can body by an edge rolling process. Accordingly, the coating applied to the can end stock typically has a certain degree of toughness and flexibility, such that it can withstand extensive fabrication processes, in addition to some or all of the other desirable features discussed above. Various coatings such as epoxy-based and polyvinyl chloride-based, e.g. organosol type, coatings have been used in the past to coat the interior of metal cans to prevent corrosion. However, there is a need for food and/or beverage can liners as well as non-food container liners that can provide improved properties such as having resistance to degradation in corrosive media as well as appropriate level of flexibility.

SUMMARY OF THE INVENTION

The instant invention is an aqueous based blend composition and method of producing the same.

In one embodiment, the instant invention provides an aqueous based blend composition comprising (a) an aqueous polyolefin dispersion comprising the melt blending product of one or more base polymers and one or more stabilizing agents in the presence of water and optionally one or more neutralizing agents, wherein the polyolefin dispersion has an average volume particle size diameter in the range of from 400 to 1500 nm; and a pH range from 8 to 11; and (b) an acrylic emulsion acrylic solids having an average weight particle size diameter in the range of from 75 to 450 nm; an acid level in the range of from 0.25 to 5 percent by weight of acid monomers based on the weight of the acrylic monomer, and a weight average molecular weight in the range of from 200,000 to 5,000,000 g/mole, and a glass transition temperature ($T_g$) in the range of from 7 to 100° C., wherein said acrylic emulsion has a pH in the range of from 7 to 11; wherein said aqueous based blend composition has a solid content in the range of from 15 to 70 percent by weight of solids, based on the weight of the aqueous based blend composition, and a pH in the range of from 7 to 11. In an alternative embodiment, the instant invention further provides a process for producing an aqueous based blend composition comprising: (1) selecting an aqueous polyolefin dispersion comprising the melt blending product of one or more base polymers and one or more stabilizing agents in the presence of water and optionally one or more neutralizing agents, wherein the polyolefin dispersion has an average volume particle size diameter in the range of from 400 to 1500 nm, and a pH range from 8 to 11; and (2) selecting an acrylic emulsion acrylic solids having an average weight particle size diameter in the range of from 75 to 450 nm; an acid level in the range of from 0.25 to 5 percent by weight of acid monomers based on the weight of the acrylic monomer, and a weight average molecular weight in the range of from 200,000 to 5,000,000 g/mole, and a glass transition temperature ($T_g$) in the range of from 7 to 100° C., wherein said acrylic emulsion has a pH in the range of from 7 to 9; (3) contacting said aqueous polyolefin dispersion and said acrylic emulsion to produce said aqueous based blend composition, wherein said aqueous based blend composition has a solid content in the range of from 15 to 70 percent by weight of solids, based on the weight of the aqueous based blend composition, and a pH in the range of from 7 to 11.

DETAILED DESCRIPTION OF THE INVENTION

The instant invention is an aqueous based blend composition and method of producing the same.

In one embodiment, the instant invention provides an aqueous based blend composition comprising (a) an aqueous polyolefin dispersion comprising the melt blending product of one or more base polymers and one or more stabilizing agents in the presence of water and optionally one or more neutralizing agents, wherein the polyolefin dispersion has an average volume particle size diameter in the range of from 400 to 1500 nm; and a pH range from 8 to 11; and (b) an acrylic emulsion acrylic solids having an average weight particle size diameter in the range of from 75 to 450 nm; an acid level in the range of from 0.25 to 5 percent by weight of acid monomers based on the weight of the acrylic monomer, and a weight average molecular weight in the range of from 200,000 to 5,000,000 g/mole, and a glass transition temperature ($T_g$) in the range of from 7 to 100° C., wherein said acrylic emulsion has a pH in the range of from 7 to 11; wherein said aqueous based blend composition has a solid content in the range of from 15 to 70 percent by weight of solids, based on the weight of the aqueous based blend composition, and a pH in the range of from 7 to 11. In an alternative embodiment, the instant invention further provides a process for producing an aqueous based blend composition comprising: (1) selecting an aqueous polyolefin dispersion comprising the melt blending product of one or more base polymers and one or more stabilizing agents in the presence of water and optionally one or more neutralizing agents, wherein the polyolefin dispersion has an average volume particle size diameter in the range of from 400 to 1500 nm, and a pH range from 8 to 11; and (2) selecting an acrylic emulsion acrylic solids having an average weight particle size diameter in the range of from 75 to 450 nm; an acid level in the range of from 0.25 to 5 percent by weight of acid monomers based on the weight of the acrylic monomer, and a weight average molecular weight in the range of from 200,000 to 5,000,000 g/mole, and a glass transition temperature ($T_g$) in the range of from 7 to 100° C., wherein said acrylic emulsion has a pH in the range of from 7 to 9; (3) contacting said aqueous polyolefin dispersion and said acrylic emulsion to produce said aqueous based blend composition, wherein said aqueous based blend composition has a solid content in the range of from 15 to 70 percent by weight of solids, based on the weight of the aqueous based blend composition, and a pH in the range of from 7 to 11.

Aqueous Polyolefin Dispersion Component

The aqueous polyolefin dispersion component of the present invention comprises the melt blending product of one or more base polymers and one or more stabilizing agents in the presence of water and optionally one or more neutralizing agents, wherein the polyolefin dispersion has an average volume particle size diameter in the range of from 400 to 1500 nm; a pH range from 8 to 11, a solid content in the range of from 25 to 75, e.g. from 35 to 65, weight percent, based on the weight of the dispersion.

Base Polymer

The aqueous polyolefin dispersion comprises from 25 to 99 percent by weight of one or more base polymers, based on the total weight of the solid content of the aqueous dispersion. All individual values and sub ranges from 25 to 99 weight percent are included herein and disclosed herein; for example, the weight percent can be from a lower limit of 25, 30, 35, or 45 weight percent to an upper limit of 50, 55, 60, 65, 70, 75, 85, 90, or 95 weight percent. For example, the aqueous dispersion may comprise from 25 to 95, or from 35 to 95, or 35 to 85, or from 45 to 95 percent by weight of one or more base polymers, based on the total weight of the solid content of the aqueous dispersion. The aqueous dispersion comprises at least one or more base polymers. The base polymer may, for example, be a thermoplastic material. The one or more base polymers may comprise one or more olefin based polymers.

Examples of thermoplastic materials include, but are not limited to, homopolymers and copolymers (including elastomers) of one or more alpha-olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene, as typically represented by ethylene-butadiene copolymer and ethylene-ethylidene norbornene copolymer; and polyolefins (including elastomers) such as copolymers of two or more alpha-olefins with a conjugated or non-conjugated diene, as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer; styrenic copolymers (including elastomers) such as polystyrene, ABS, acrylonitrile-styrene copolymer, α-methylstyrene-styrene copolymer, styrene vinyl alcohol, styrene acrylates such as styrene methylacrylate, styrene butyl acrylate, styrene butyl methacrylate, and styrene butadienes and crosslinked styrene polymers; and styrene block copolymers (including elastomers) such as styrene-butadiene copolymer and hydrate thereof, and styrene-isoprene-styrene triblock copolymer; polyvinyl compounds such as polyvinyl chloride, polyvinylidene chloride, vinyl chloride-vinylidene chloride copolymer, polymethyl acrylate, and polymethyl methacrylate; polyamides such as nylon 6, nylon 6,6, and nylon 12; thermoplastic polyesters such as polyethylene terephthalate and polybutylene terephthalate; polycarbonate, polyphenylene oxide, and the like; and glassy hydrocarbon-based resins, including poly-dicyclopentadiene polymers and related polymers (copolymers, terpolymers); saturated mono-olefins such as vinyl acetate, vinyl propionate, vinyl versatate, and vinyl butyrate and the like; vinyl esters such as esters of monocarboxylic acids, including methyl acrylate, ethyl acrylate, n-butyl acrylate, isobutyl acrylate, 2-ethylhexyl acrylate, dodecyl acrylate, n-octyl acrylate, phenyl acrylate, methyl methacrylate, ethyl methacrylate, and butyl methacrylate and the like; acrylonitrile, methacrylonitrile, acrylamide, mixtures thereof; resins produced by ring opening metathesis and cross metathesis polymerization and the like. These resins may be used either alone or in combinations of two or more.

Exemplary (meth)acrylates, as base polymers, include, but are not limited to, methyl acrylate, ethyl acrylate, butyl acrylate, hexyl acrylate, 2-ethylhexyl acrylate, octyl acrylate and isooctyl acrylate, n-decyl acrylate, isodecyl acrylate, tert-butyl acrylate, methyl methacrylate, butyl methacrylate, hexyl methacrylate, isobutyl methacrylate, isopropyl methacrylate as well as 2-hydroxyethyl acrylate and acrylamide. The preferred (meth)acrylates are methyl acrylate, ethyl acrylate, butyl acrylate, 2-ethylhexyl acrylate, octyl acrylate, isooctyl acrylate, methyl methacrylate and butyl methacrylate. Other suitable (meth)acrylates that can be polymerized from monomers include lower alkyl acrylates and methacrylates including acrylic and methacrylic ester monomers: methyl acrylate, ethyl acrylate, n-butyl acrylate, t-butyl acrylate, 2-ethylhexyl acrylate, decyl acrylate, isobornyl acrylate, methyl methacrylate, ethyl methacrylate, n-propyl methacrylate, isopropyl methacrylate, n-butyl methacrylate, isobutyl methacrylate, sec-butyl methacrylate, cyclohexyl methacrylate, isodecyl methacrylate, isobornyl methacrylate, t-butylaminoethyl methacrylate, stearyl methacrylate, glycidyl methacrylate, dicyclopentenyl methacrylate, phenyl methacrylate.

In selected embodiments, base polymer may, for example, comprise one or more polyolefins selected from the group consisting of ethylene-alpha olefin copolymers, propylene-alpha olefin copolymers, and olefin block copolymers. In particular, in select embodiments, the base polymer may comprise one or more non-polar polyolefins.

In specific embodiments, polyolefins such as polypropylene, polyethylene, copolymers thereof, and blends thereof, as well as ethylene-propylene-diene terpolymers, may be used. In some embodiments, exemplary olefinic polymers include homogeneous polymers, as described in U.S. Pat. No. 3,645,992; high density polyethylene (HDPE), as described in U.S. Pat. No. 4,076,698; heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers, which can be prepared, for example, by processes disclosed in U.S. Pat. Nos. 5,272,236 and 5,278,272, the disclosures of which are incorporated herein by reference; and high pressure, free radical polymerized ethylene polymers and copolymers such as low density polyethylene (LDPE) or ethylene vinyl acetate polymers (EVA).

In other particular embodiments, the base polymer may, for example, be ethylene vinyl acetate (EVA) based polymers. In other embodiments, the base polymer may, for example, be ethylene-methyl acrylate (EMA) based polymers. In other particular embodiments, the ethylene-alpha olefin copolymer may, for example, be ethylene-butene, ethylene-hexene, or ethylene-octene copolymers or interpolymers. In other particular embodiments, the propylene-alpha olefin copolymer may, for example, be a propylene-ethylene or a propylene-ethylene-butene copolymer or interpolymer.

In one embodiment, the base polymer may be a conventional polypropylene such as propylene homopolymer and/or a random propylene copolymer (RCP). The propylene homopolymer can have a melt flow rate in the range of from 1 to 100 g/10 minutes and a DSC melting point of 140° C. to 170° C. The RCP can have a DSC melting point in the range of from 120° C. to 160° C., for example, from 130° C. to 160° C., or from 141° C. to 159° C., and a melt flow rate (MFR) in the range of from 1 to 120 g/10 minutes, for example, from 5 to 120 g/10 minutes, or from 11 to 99 g/10 minutes, or from 19 to 84 g/10 minutes, measured according to ASTM-D 1238, (230° C./2.16 kg). Such RCP materials are commercially available under various trade names from Braskem America Inc. or Formosa Plastics Corporation, USA.

In certain other embodiments, the base polymer may, for example, be a semi-crystalline polymer and may have a melting point of less than 110° C. In another embodiment, the melting point may be from 25 to 100° C. In another embodiment, the melting point may be between 40 and 85° C.

In one particular embodiment, the base polymer is a propylene/alpha-olefin copolymer, which is characterized as having substantially isotactic propylene sequences. "Substantially isotactic propylene sequences" means that the sequences have an isotactic triad (mm) measured by $^{13}$C NMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refer to the isotactic sequence in terms of a triad unit in the copolymer molecular chain determined by $^{13}$C NMR spectra.

The propylene/alpha-olefin copolymer may have a melt flow rate in the range of from 0.1 to 25 g/10 minutes, measured in accordance with ASTM D-1238 (at 230° C./2.16 Kg). All individual values and subranges from 0.1 to 25 g/10 minutes are included herein and disclosed herein; for example, the melt flow rate can be from a lower limit of 0.1 g/10 minutes, 0.2 g/10 minutes, 0.5 g/10 minutes, 2 g/10 minutes, 4 g/10 minutes, 5 g/10 minutes, 10 g/10 minutes, or 15 g/10 minutes to an upper limit of 25 g/10 minutes, 20 g/10 minutes, 18 g/10 minutes, 15 g/10 minutes, 10 g/10 minutes, 8 g/10 minutes, or 5 g/10 minutes. For example, the propylene/alpha-olefin copolymer may have a melt flow rate in the range of from 0.1 to 20 g/10 minutes; or from 0.1 to 18 g/10 minutes; or from 0.1 to 15 g/10 minutes; or from 0.1 to 12 g/10 minutes; or from 0.1 to 10 g/10 minutes; or from 0.1 to 5 g/10 minutes.

The propylene/alpha-olefin copolymer has a crystallinity in the range of from at least 1 percent by weight (a heat of fusion of at least 2 Joules/gram) to 30 percent by weight (a heat of fusion of less than 50 Joules/gram). All individual values and subranges from 1 percent by weight (a heat of fusion of at least 2 Joules/gram) to 30 percent by weight (a heat of fusion of less than 50 Joules/gram) are included herein and disclosed herein; for example, the crystallinity can be from a lower limit of 1 percent by weight (a heat of fusion of at least 2 Joules/gram), 2.5 percent (a heat of fusion of at least 4 Joules/gram), or 3 percent (a heat of fusion of at least 5 Joules/gram) to an upper limit of 30 percent by weight (a heat of fusion of less than 50 Joules/gram), 24 percent by weight (a heat of fusion of less than 40 Joules/gram), 15 percent by weight (a heat of fusion of less than 24.8 Joules/gram) or 7 percent by weight (a heat of fusion of less than 11 Joules/gram). For example, the propylene/alpha-olefin copolymer may have a crystallinity in the range of from at least 1 percent by weight (a heat of fusion of at least 2 Joules/gram) to 24 percent by weight (a heat of fusion of less than 40 Joules/gram); or in the alternative, the propylene/alpha-olefin copolymer may have a crystallinity in the range of from at least 1 percent by weight (a heat of fusion of at least 2 Joules/gram) to 15 percent by weight (a heat of fusion of less than 24.8 Joules/gram); or in the alternative, the propylene/alpha-olefin copolymer may have a crystallinity in the range of from at least 1 percent by weight (a heat of fusion of at least 2 Joules/gram) to 7 percent by weight (a heat of fusion of less than 11 Joules/gram); or in the alternative, the propylene/alpha-olefin copolymer may have a crystallinity in the range of from at least 1 percent by weight (a heat of fusion of at least 2 Joules/gram) to 5 percent by weight (a heat of fusion of less than 8.3 Joules/gram). The crystallinity is measured via Differential scanning calorimetry (DSC) method. The propylene/alpha-olefin copolymer comprises units derived from propylene and polymeric units derived from one or more alpha-olefin comonomers. Exemplary comonomers utilized to manufacture the propylene/alpha-olefin copolymer are $C_2$, and $C_4$ to $C_{10}$ alpha-olefins; for example, $C_2$, $C_4$, $C_6$ and $C_8$ alpha-olefins.

The propylene/alpha-olefin copolymer comprises from 1 to 40 percent by weight of units derived from one or more alpha-olefin comonomers. All individual values and subranges from 1 to 40 weight percent are included herein and disclosed herein; for example, the weight percent of units derived from one or more alpha-olefin comonomers can be from a lower limit of 1, 3, 4, 5, 7, or 9 weight percent to an upper limit of 40, 35, 30, 27, 20, 15, 12, or 9 weight percent.

For example, the propylene/alpha-olefin copolymer comprises from 1 to 35 percent by weight of units derived from one or more alpha-olefin comonomers; or in the alternative, the propylene/alpha-olefin copolymer comprises from 1 to 30 percent by weight of units derived from one or more alpha-olefin comonomers; or in the alternative, the propylene/alpha-olefin copolymer comprises from 3 to 27 percent by weight of units derived from one or more alpha-olefin comonomers; or in the alternative, the propylene/alpha-olefin copolymer comprises from 3 to 20 percent by weight of units derived from one or more alpha-olefin comonomers; or in the alternative, the propylene/alpha-olefin copolymer comprises from 3 to 15 percent by weight of units derived from one or more alpha-olefin comonomers.

The propylene/alpha-olefin copolymer has a molecular weight distribution (MWD), defined as weight average molecular weight divided by number average molecular weight ($M_w/M_n$) of 3.5 or less; in the alternative 3.0 or less; or in another alternative from 1.8 to 3.0.

Such propylene/alpha-olefin copolymers are further described in details in the U.S. Pat. Nos. 6,960,635 and 6,525,157, incorporated herein by reference. Such propylene/alpha-olefin copolymers are commercially available from The Dow Chemical Company, under the tradename VERSIFY™, or from ExxonMobil Chemical Company, under the tradename VISTAMAXX™.

In one embodiment, the propylene/alpha-olefin copolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a $C_{4-10}$ α-olefin; and containing an average of at least 0.001, preferably an average of at least 0.005 and more preferably an average of at least 0.01, long chain branches/1000 total carbons, wherein the term long chain branch, as used herein, refers to a chain length of at least one (1) carbon more than a short chain branch, and short chain branch, as used herein, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. The maximum number of long chain branches typically it does not exceed 3 long chain branches/1000 total carbons. Such propylene/alpha-olefin copolymers are further described in details in the U.S. Provisional Patent Application No. 60/988,999 and International Patent Application No. PCT/U.S. Ser. No. 08/082,599, each of which is incorporated herein by reference.

In certain other embodiments, the base polymer, e.g. propylene/alpha-olefin copolymer, may, for example, be a semi-crystalline polymer and may have a melting point of less than 110° C. In preferred embodiments, the melting point may be from 25 to 100° C. In more preferred embodiments, the melting point may be between 40 and 85° C.

In other selected embodiments, olefin block copolymers, e.g., ethylene multi-block copolymer, such as those described in the International Publication No. WO2005/090427 and U.S. Patent Application Publication No. US 2006/0199930, incorporated herein by reference to the extent describing such olefin block copolymers, may be used as the base polymer. Such olefin block copolymer may be an ethylene/α-olefin interpolymer:

(a) having a $M_w/M_n$ from about 1.7 to about 3.5, at least one melting point, $T_m$, in degrees Celsius, and a density, d, in grams/cubic centimeter, wherein the numerical values of $T_m$ and d corresponding to the relationship:

$$T_m > -2002.9 + 4538.5(d) - 2422.2(d)^2; \text{ or}$$

(b) having a $M_w/M_n$ from about 1.7 to about 3.5, and being characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH having the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak being determined using at least 5 percent of the cumulative polymer, and if less than 5 percent of the polymer having an identifiable CRYSTAF peak, then the CRYSTAF temperature being 30° C.; or (c) being characterized by an elastic recovery, Re, in percent at 300 percent strain and 1 cycle measured with a compression-molded film of the ethylene/α-olefin interpolymer, and having a density, d, in grams/cubic centimeter, wherein the numerical values of Re and d satisfying the following relationship when ethylene/α-olefin interpolymer being substantially free of a cross-linked phase:

$$Re > 1481 - 1629(d); \text{ or}$$

(d) having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer; or (e) having a storage modulus at 25° C., G' (25° C.), and a storage modulus at 100° C., G' (100° C.), wherein the ratio of G' (25° C.) to G' (100° C.) being in the range of about 1:1 to about 9:1.

Such olefin block copolymer, e.g. ethylene/α-olefin interpolymer may also:

(a) have a molecular fraction which elutes between 40° C. and 130° C. when fractionated using TREF, characterized in that the fraction having a block index of at least 0.5 and up to about 1 and a molecular weight distribution, $M_w/M_n$, greater than about 1.3; or (b) have an average block index greater than zero and up to about 1.0 and a molecular weight distribution, $M_w/M_n$, greater than about 1.3.

In certain embodiments, the base polymer may, for example, comprise a polar polymer, having a polar group as either a comonomer or grafted monomer. In exemplary embodiments, the base polymer may, for example, comprise one or more polar polyolefins, having a polar group as either a comonomer or grafted monomer. Exemplary polar polyolefins include, but are not limited to, ethylene-acrylic acid (EAA) and ethylene-methacrylic acid copolymers, such as those available under the trademarks PRIMACOR™, commercially available from The Dow Chemical Company, NUCREL™, commercially available from E.I. DuPont de Nemours, and ESCOR™, commercially available from ExxonMobil Chemical Company and described in U.S. Pat. Nos. 4,599,392, 4,988,781, and 5,938,437, each of which is incorporated herein by reference in its entirety. Other exemplary base polymers include, but are not limited to, ethylene ethyl acrylate (EEA) copolymer, ethylene methyl methacrylate (EMMA), and ethylene butyl acrylate (EBA).

In one embodiment, the base polymer may, for example, comprise a polar polyolefin selected from the group consisting of ethylene-acrylic acid (EAA) copolymer, ethylene-methacrylic acid copolymer, and combinations thereof, and the stabilizing agent may, for example, comprise a polar polyolefin selected from the group consisting of ethylene-acrylic acid (EAA) copolymer, ethylene-methacrylic acid copolymer, and combinations thereof; provided, however, that base polymer may, for example, have a lower acid number, measured according to ASTM D-974, than the stabilizing agent.

Those having ordinary skill in the art will recognize that the above list is a non-comprehensive listing of exemplary base polymers. It will be appreciated that the scope of the present invention is restricted by the claims only.

Stabilizing Agent

The dispersion according to the present invention may further comprise at least one or more stabilizing agents, also referred to herein as dispersion agents, to promote the formation of a stable dispersion. The stabilizing agent may preferably be an external stabilizing agent. The dispersion of the instant invention comprises 1 to 50 percent by weight of one or more stabilizing agents, based on the total weight of the solid content of the dispersion. All individual values and subranges from 1 to 50 weight percent are included herein and disclosed herein; for example, the weight percent can be from a lower limit of 1, 3, 5, 10 weight percent to an upper limit of 15, 25, 35, 45, or 50 weight percent. For example, the dispersion may comprise from 1 to 25, or in the alternative from 1 to 35, or in the alternative from 1 to 40, or in the alternative from 1 to 50 percent by weight of one or more stabilizing agents, based on the total weight of the solid content of the dispersion. In selected embodiments, the stabilizing agent may be a surfactant, a polymer, or mixtures thereof. In certain embodiments, the stabilizing agent can be a polar polymer, having a polar group as either a comonomer or grafted monomer. In exemplary embodiments, the stabilizing agent comprises one or more polar polyolefins, having a polar group as either a comonomer or grafted monomer. Exemplary polymeric stabilizing agents include, but are not limited to, ethylene-acrylic acid (EAA) and ethylene-methacrylic acid copolymers, such as those available under the trademarks PRIMACOR™, commercially available from The Dow Chemical Company, NUCREL™, commercially available from E.I. DuPont de Nemours, and ESCOR™ commercially available from ExxonMobil Chemical Company and described in U.S. Pat. Nos. 4,599,392, 4,988,781, and 5,938,437, each of which is incorporated herein by reference in its entirety. Other exemplary polymeric stabilizing agents include, but are not limited to, ethylene ethyl acrylate (EEA) copolymer, ethylene methyl methacrylate (EMMA), and ethylene butyl acrylate (EBA). Other ethylene-carboxylic acid copolymer may also be used. Those having ordinary skill in the art will recognize that a number of other useful polymers may also be used. Such polymers are commercially available, for example, under the trade names LICOCENE from Clariant Corporation, EXXELOR from ExxonMobil Chemical Company, or Epolene from Westlake Chemical Company.

Other stabilizing agents that may be used include, but are not limited to, long chain fatty acids, fatty acid salts, or fatty acid alkyl esters having from 12 to 60 carbon atoms. In other embodiments, the long chain fatty acid or fatty acid salt may have from 12 to 40 carbon atoms.

The stabilizing agent may be partially or fully neutralized with a neutralizing agent. In certain embodiments, neutralization of the stabilizing agent, such as a long chain fatty acid or EAA, may be from 25 to 200 percent on a molar basis; or in the alternative, it may be from 50 to 110 percent on a molar basis. For example, for EAA, the neutralizing agent may be a base, such as ammonium hydroxide or potassium hydroxide, for example. Other neutralizing agents can include lithium hydroxide or sodium hydroxide, for example. In another alternative, the neutralizing agent may, for example, be a carbonate. In another alternative, the neutralizing agent may, for example, be any amine such as monoethanolamine, or 2-amino-2-methyl-1-propanol (AMP) Amines useful in embodiments disclosed herein may include monoethanolamine, diethanolamine, triethanolamine, and TRIS AMINO (each available from Angus), NEUTROL TE (available from BASF), as well as triisopropanolamine, diisopropanolamine, and N,N-dimethylethanolamine (each available from The Dow Chemical Company, Midland, Mich.). Other useful amines may include ammonia, monomethylamine, dimethylamine, trimethylamine, monoethylamine, diethylamine, triethylamine, mono-n-propylamine, dimethyl-n propylamine, N-methanol amine, N-aminoethylethanolamine, N-methyldiethanolamine, monoisopropanolamine, N,N-dimethyl propanolamine, 2-amino-2-methyl-1-propanol, tris(hydroxymethyl)-aminomethane, N,N,N'N'-tetrakis(2-hydroxylpropyl) ethylenediamine, 1.2-diaminopropane. In some embodiments, mixtures of amines or mixtures of amines and surfactants may be used. Those having ordinary skill in the art will appreciate that the selection of an appropriate neutralizing agent depends on the specific composition formulated, and that such a choice is within the knowledge of those of ordinary skill in the art.

Additional stabilizing agents that may be useful in the practice of the present invention include, but are not limited to, cationic surfactants, anionic surfactants, or non-ionic surfactants. Examples of anionic surfactants include, but are not limited to, sulfonates, carboxylates, and phosphates. Examples of cationic surfactants include, but are not limited to, quaternary amines Examples of non-ionic surfactants include, but are not limited to, block copolymers containing ethylene oxide and silicone surfactants. Stabilizing agents useful in the practice of the present invention can be either external surfactants or internal surfactants. External surfactants are surfactants that do not become chemically reacted into the base polymer during dispersion preparation. Examples of external surfactants useful herein include, but are not limited to, salts of dodecyl benzene sulfonic acid and lauryl sulfonic acid salt. Internal surfactants are surfactants that do become chemically reacted into the base polymer during dispersion preparation. An example of an internal surfactant useful herein includes 2,2-dimethylol propionic acid and its salts. Additional surfactants that may be useful in the practice of the present invention include cationic surfactants, anionic surfactants, non-ionic surfactants, or combinations thereof. Various commercially available surfactants may be used in embodiments disclosed herein, including: OP-100 (a sodium stearate), OPK-1000 (a potassium stearate), and OPK-181 (a potassium oleate), each available from RTD Hallstar; UNICID 350, available from Baker Petrolite; DISPONIL FES 77-IS and DISPONIL TA-430, each available from Cognis; RHODAPEX CO-436, SOPROPHOR 4D384, 3D-33, and 796/P, RHODACAL BX-78 and LDS-22, RHODAFAC RE-610, and RM-710, and SUPRAGIL MNS/90, each available from Rhodia; and TRITON QS-15, TRITON W-30, DOWFAX 2A1, DOWFAX 3B2, DOWFAX 8390, DOWFAX C6L, TRITON X-200, TRITON XN-455, TRITON H-55, TRITON GR-5M, TRITON BG-10, and TRITON CG-110, each available from The Dow Chemical Company, Midland, Mich.

Fluid Medium

The dispersion further comprises a fluid medium. The fluid medium is water. The dispersion of the instant invention comprises 35 to 85 percent by weight of water; for example from 25 to 75 percent by weight of water, or in the alternative, from 40 to 60 percent by weight of water, or in the alternative, from 45 to 55 percent by weight of water, based on the weight of the dispersion. Water content of the dispersion may preferably be controlled so that the solids content (base polymer plus stabilizing agent) is between about 25 percent to about 75 percent by weight, based on the weight of the dispersion.

Additional Components

The aqueous polyolefin dispersion according to the present invention may further comprise optionally one or more co-solvents, e.g. glycols, glycol ether, 2,2,4-trimethyl-1,3-pentanediol monoisobutyrate, alcohols, mineral spirits, and benzoate esters; optionally one or more dispersants, e.g. aminoalcohols, and polycarboxylates; optionally one or more surfactants; optionally one or more antioxidants such as hindered phenolic, e.g. PENTAERYTHRITOL TETRAKIS(3,5-DI-TERT-BUTYL-4-HYDROXYHYDROCINNAMATE), optionally one or more lubricants, optionally one or more defoamers; optionally one or more crosslinking agents; optionally one or more preservatives, e.g. biocides, mildewcides, fungicides, algaecides, and combinations thereof; optionally one or more thickeners, e.g. cellulosic based thickeners such as hydroxyethyl cellulose, hydrophobically modified alkali soluble emulsions (HASE thickeners such as UCAR POLYPHOBE TR-116) and hydrophobically modified ethoxylated urethane thickeners (HEUR); or optionally one or more additional neutralizing agents, e.g. hydroxides, amines, ammonia, and carbonates.

Forming the Aqueous Polyolefin Dispersion

The aqueous polyolefin dispersion can be formed by any number of methods recognized by those having skill in the art. In one embodiment, one or more base polymers, one or more stabilizing agents are melt-kneaded in an extruder along with water and a neutralizing agent, such as ammonia, potassium hydroxide, or a combination of the two to form a dispersion. In some embodiments, the dispersion is first diluted to contain about 1 to about 3% by weight water and then, subsequently, further diluted to comprise greater than about 25% by weight water.

Any melt-kneading means known in the art may be used. In some embodiments, a kneader, a BANBURY® mixer, single-screw extruder, or a multi-screw extruder, e.g. a twin screw extruder, is used. A process for producing the dispersions in accordance with the present invention is not particularly limited. For example, an extruder, in certain embodiments, for example, a twin screw extruder, is coupled to a back pressure regulator, melt pump, or gear pump. Exemplary embodiments also provide a base reservoir and an initial water reservoir, each of which includes a pump. Desired amounts of base and initial water are provided from the base reservoir and the initial water reservoir, respectively. Any suitable pump may be used, but in some embodiments, for example, a pump that provides a flow of about 150 cc/min at a pressure of 240 bar is used to provide the base and the initial water to the extruder. In other embodiments, a liquid injection pump provides a flow of 300 cc/min at 200 bar or 600 cc/min at 133 bar. In some embodiments, the base and initial water are preheated in a preheater.

One or more base polymers, in the form of pellets, powder, or flakes, are fed from the feeder to an inlet of the extruder where the resin is melted. In some embodiments, the dispersing agent is added to one or more base polymers through and along with the resin and in other embodiments, the dispersing agent is provided separately to the twin screw extruder. The resin melt is then delivered from the mix and convey zone to an emulsification zone of the extruder where the initial amount of water and base from the water and base reservoirs are added through an inlet. In some embodiments, dispersing agent may be added additionally or exclusively to the water stream. In some embodiments, further dilution water may be added via water inlet from water reservoir in a dilution and cooling zone of the extruder. Typically, the dispersion is diluted to at least 30 weight percent water in the cooling zone. In addition, the diluted mixture may be diluted any number of times until the desired dilution level is achieved. In some embodiments, water is not added into the twin screw extruder but rather to a stream containing the resin melt after the melt has exited from the extruder. In this manner, steam pressure build-up in the extruder is eliminated and the dispersion is formed in a secondary mixing device such as a rotor stator mixer.

In one embodiment, the present invention further provides a process for producing a dispersion comprising the steps of (1) selecting one or more base polymers; (2) selecting one or more stabilizing agents; (3) selecting a liquid media comprising water; (4) optionally selecting one or more neutralizing agents; (5) melt-blending the one or more base polymers and one or more stabilizing agents in the presence of water and optionally one or more neutralizing agents; (6) thereby forming an emulsified mixture; (7) contacting said emulsified mixture with additional dilution water while optionally removing heat therefrom; (8) thereby forming solid particles dispersed in said water; and (9) thereby forming said dispersion.

Acrylic Emulsion Component

The acrylic emulsion component comprises from 20 to 70, for example from 40 to 60, or in the alternative from 45 to 60, percent by weight of acrylic solids, based on the weight of the acrylic emulsion. The acrylic solids present in the acrylic emulsion have an average weight particle size diameter in the range of from 75 to 450 nm, for example, from 115 to 375, or in the alternative from 150 to 300. The acrylic polymer present in the acrylic emulsion component has an acid level in the range of from 0.25 to 5, for example from 0.25 to 3, or in the alternative from 0.5 to 2.5, or in the alternative from 1 to 2 percent by weight of acid monomers based on the total weight of the acrylic monomers. The acrylic polymer present in the acrylic emulsion component has a weight average molecular weight in the range of from 200,000 to 5,000,000 g/mole, for example from 200,000 to 1,000,000 g/mole, or in the alternative from 200,000 to 750,000 g/mole). The acrylic polymer present in the acrylic emulsion component has a glass transition temperature ($T_g$) in the range of from 0 to 100° C., for example from 7 to 100° C., or in the alternative from 10 to 80° C., or in the alternative from 20 to 65° C. The acrylic emulsion component of the present invention has a pH in the range of from 7 to 10, for example, from 7 to 9.

In a different embodiment of the invention, the acrylic emulsion component may contain from 0.25 to 5, for example from 0.25 to 3, or in the alternative from 0.5 to 2.5, or in the alternative from 1 to 2 percent by weight based on the total weight of the acrylic monomers, copolymerized ethylenically unsaturated carboxylic acid monomer, such as, for example, acrylic acid, methacrylic acid, crotonic acid, itaconic acid, fumaric acid, maleic acid, monomethyl itaconate, monomethyl fumarate, monobutyl fumarate, and maleic anhydride.

Suitable mono-ethylenically unsaturated acid or diacid monomers may include, for example, (meth)acrylic acid, itaconic acid, monomethyl itaconate, (meth)acryloxypropionic acid, aconitic acid, fumaric acid, crotonic acid, maleic acid, anhydrides thereof, e.g. maleic anhydride; monomethyl maleate; monoalkyl itaconates; monoalkyl fumarates, e.g. monomethyl fumarate; 2-acrylamido-2-methylpropane sulfonic acid; vinyl sulfonic acid; styrene sulfonic acid; 1-allyloxy-2-hydroxypropane sulfonic acid; alkyl allyl sulfosuccinic acid; sulfoethyl (meth)acrylate; phosphoalkyl (meth)acrylates, such as phosphoethyl (meth)acrylate; phosphodialkyl (meth)acrylates; and allyl phosphate. Preferred acid monomers are (meth)acrylic acid, itaconic acid, fumaric acid and maleic acid.

In yet another embodiment of the invention, the acrylic emulsion component may contain from 0 percent to 5 percent by weight based on the total weight of the acrylic monomers, copolymerized multi-ethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, and divinyl benzene.

In one embodiment, the acrylic emulsion polymer, e.g. homopolymer or copolymer, can be prepared, for example, by charging, at once or gradually, the monomeric ingredients, water and a surfactant (when employed) into a reaction vessel, purging the vessel with an inert gas, such as, for example, nitrogen and heating the vessel to a reaction temperature in the range of from 50 to 100° C. When the reaction vessel reaches the desired reaction temperature, one or more initiators are added to the reaction vessel. The reaction is continued for a period of time sufficient to complete the polymerization process, for example, a period in the range of from 1 to 4 hours. Upon near completion or the completion of the reaction, the reactor vessel and reaction content contained therein are cooled. This synthesis yields an aqueous polymeric composition comprising the polymer, e.g. homopolymer or copolymer, in water. In some instances, the composition has the appearance of a milky emulsion, while in other instances it looks like a clear or hazy solution.

The process for production of the copolymer may include the use of a seed which may be a (meth)acrylate, polystyrene or other seed useful to control the particle size of the emulsion. As is well known in the art, the regulation of initial seed can be used to control the ultimate range of particle sizes in the copolymer produced.

As used herein, the term "(meth)acrylate" means acrylate, methacrylate, and mixtures thereof and the term "(meth)acrylic" used herein means acrylic, methacrylic, and mixtures thereof.

Suitable mono-ethylenically unsaturated monomers may include nonionic monomers such as, for example, (meth)acrylic ester monomers including, for example, $C_1$ to $C_{30}$ (cyclo)alkyl (meth)acrylates, such as, for example methyl (meth)acrylate, ethyl methacrylate, butyl (meth)acrylate, 2-ethylhexyl (meth)acrylate, decyl acrylate, lauryl (meth)acrylate, isodecyl (meth)acrylate; (meth)acrylamide, substituted (meth)acrylamides, such as N-alkyl (meth)acrylamides and N,N-dialkyl (meth)acrylamides; ethylene; propylene; styrene and substituted styrenes; butadiene; vinyl esters, such as vinyl acetate and vinyl butyrate; vinyl chloride, vinyl toluene, and vinyl benzophenone; (meth)acrylonitrile; and vinylidene halides, such as, vinylidene chloride. Suitable ionic and hydrophilic mono-ethylenically unsaturated monomers may include, for example, hydroxyalkyl (meth)acrylates; glycidyl (meth)acrylate; mono-ethylenically unsaturated acid monomers; acetoacetoxyethyl (meth)acrylate, acetoacetoxyalkyl (meth)acrylates; amine-group containing monomers, such as vinyl imidazole, 2-(3-oxazolidinyl)ethyl (meth)acrylate and amine-functional (meth) acrylates, such as tert-butylaminoethyl (meth)acrylate, N,N-dimethylaminoethyl (meth)acrylate and N,N-dimethylaminopropyl (meth)acrylate; N-vinyl pyrrolidone; sodium vinyl sulfonate; phosphoethyl (meth)acrylate; acrylamido propane sulfonate; diacetone acrylamide; ethyleneureido-functional monomers; isocyanatoalkyl (meth)acrylate, and allyl acetoacetate.

Anionic, nonionic, and amphoteric surface active agents, that is, surfactants, can be employed in the copolymer synthesis process.

The acrylic emulsion may be polymerized via free radical polymerization, including, for example, thermal, redox (using redox catalysts), photochemical, and electrochemical initiation. Suitable free radical initiators or oxidants may include, for example, persulfates, such as, for example, ammonium and/or alkali metal persulfates; peroxides, such as, for example, sodium or potassium hydroperoxide, t-alkyl peroxides, t-alkyl hydroperoxides, dicumyl hydroperoxide; or t-alkyl peresters, wherein the t-alkylgroup includes at least 5 carbon atoms; perboric acids and their salts, such as, for example, sodium perborate; perphosphoric acids and salts thereof; potassium permanganate; and ammonium or alkali metal salts of peroxydisulfuric acid. Such initiators may be used in amounts ranging from 0.01 to 3.0 weight percent, based on the total weight of monomers.

Suitable redox catalysts comprise one or more oxidant with a suitable reductant. Suitable reductants may include, for example, sodium sulfoxylate formaldehyde; (iso)ascorbic acid; alkali metal and ammonium salts of sulfur-containing acids, such as sodium (bi)sulfite, thiosulfate, hydrosulfite, (hydro)sulfide or dithionite; formadinesulfinic acid; hydroxymethanesulfonic acid; sodium 2-hydroxy-2-sulfinatoacetic acid; acetone bisulfate; amines, such as ethanolamine, glycolic acid; glyoxylic acid hydrate; lactic acid; glyceric acid, malic acid; tartaric acid; and salts of thereof may be used in amounts of from 0.01 to 5.0 weight percent based on the total weight of monomers.

Redox reaction catalyzing metal salts of iron, copper, manganese, silver, platinum, vanadium, nickel, chromium, palladium, or cobalt may be added for the formation of such polymers. Typical levels of catalytic metal salts used is in the range of from 0.01 ppm to 25 ppm, and may range up to 1.0 wt. %, based on the total weight of monomers. Mixtures of two or more catalytic metal salts may also be usefully employed. Chelating ligands, which can be used with catalytic metal salts, include multidentate aminocarboxylate ligands, such as, for example, nitrilotriacetic acid (NTA, a tetradentate ligand), ethylene diamine diacetic acid (EDDA, a tetradentate ligand), N-(hydroxyethyl) ethylene diamine triacetic acid (HEDTA, a pentadentate ligand), and ethylene diamine tetraacetic acid (EDTA, a hexadentate ligand).

Any monomer in any polymerization may be added neat, i.e., not as an emulsion in water, or as an emulsion in water. The monomer may be added in one or more additions or continuously, linearly or not, over the reaction period, or combinations thereof. Suitable surfactants include cationic, anionic, and non-ionic surfactants. Anionically stabilized emulsion polymers may be stabilized by anionic surfactant or a mixture thereof with one on more nonionic surfactant. Conventional surfactants may be used to stabilize the emulsion polymerization systems before, during, and after polymerization of monomers. These conventional surfactants will usually be present at levels of 0.1 percent to 6 percent by weight based on the total weight of monomer in polymerization. At least one anionic, nonionic, or amphoteric surfactant may be used, or mixtures thereof. Examples of anionic emulsifiers include sodium lauryl sulfate, sodium dodecyl benzene sulfonate, dioctylsulfosuccinate, sodium polyoxyethylene lauryl ether sulfate, sodium dodecyl diphenyloxide disulfonate and other diphenylsulfonate derivatives, and sodium salt of tert-octylphenoxyethoxypoly(39)ethoxyethyl sulfate. Surfactants in the free acid form and in the salt form with other counterions may also be used, for example dodecylbenzene sulfonic acid and dodecylbenzene sulfonic acid ammonium salt.

In one embodiment, the acrylic emulsion can be a single stage or multistage polymer. The polymerization techniques used for preparing the multistage acrylic polymer present in the acrylic emulsion, also referred to as hard-soft polymer particles with one component having a lower Tg (soft) relative to the other component having a higher Tg (hard), where one component is polymerized in the presence of the other are well known in the art. The hard-soft polymer particles are typically prepared by a multistage aqueous emulsion polymerization process, in which at least two stages differing in composition are polymerized in a sequential fashion. Multi-stage polymerization techniques suitable for preparing the hard-soft polymer particles are disclosed, for example, in U.S. Pat. Nos. 4,325,856, 4,654,397, and 4,814,373. In the multistage polymerization process to prepare the hard-soft polymer, either the soft polymer or the hard polymer is prepared as a dispersion of the first polymer particle in water, followed by the polymerization of the other polymer (the hard polymer or the soft polymer, respectively) in the presence of the first polymer particles to provide the hard-soft particles.

The acrylic emulsion could also be a blend of two or more acrylic emulsions with different Tgs, wherein the difference between the two or more Tgs is at least 10° C.

As used herein, unless otherwise indicated, the term "average particle size," (for acrylic emulsion) with regard to the acrylic emulsion and components thereof, means the particle size as determined by light scattering (LS) using a BI-90 particle size analyzer, Brookhaven Instruments Corp. (Holtsville, N.Y.).

As used herein, unless otherwise indicated, the phrase "molecular weight" (for acrylic emulsions) refers to the weight average molecular weight as measured by gel permeation chromatography (GPC) against a polymethylmethacrylate (PMMA) or polystyrene (PS) standard.

As used herein, unless otherwise indicated, the term "Tg" or "glass transition temperature" of a polymer, with regard to the acrylic emulsion and components thereof, refers to the Tg of a polymer calculated by using the Fox equation (T. G. Fox, Bull. Am. Physics Soc., Volume 1, Issue No. 3, page 123 (1956), i.e.

$$\frac{1}{Tg} = \frac{w_1}{Tg_{(1)}} + \frac{w_2}{Tg_{(2)}}$$

For a copolymer, $w_1$ and $w_2$ refer to the weight fraction of the two comonomers and $Tg_{(1)}$ and $Tg_{(2)}$ refer to the glass transition temperature of the two corresponding homopolymers. The Tg of various homopolymers may be found, for example, in Polymer Handbook, edited by J. Brandrup and E. H. Immergut, Interscience Publishers. The "Experimental Tg" of a polymer, with regard to the acrylic emulsion and components thereof, is measured by differential scanning calorimetry (DSC) using the mid-point in the heat flow versus temperature transition as the Tg value. A typical heating rate for the DSC measurement is 20° C./minute.

Forming the Aqueous Based Blend Composition

Aqueous polyolefin dispersion component and acrylic emulsion components are blended together via various means, for example, mixers such static mixers, also known as in-line mixers, or an agitated tank to form the aqueous based blend composition. The aqueous based blend composition can be further formulated into a coating composition by adding one or more coating formulation components such as one or more solvents, one or more crosslinkers, one or more catalysts, one or more antioxidants, one or more lubricants, and one or more additional coating formulation components, and combinations thereof. The one or more coating formulation components may be added to the aqueous based blend composition after the aqueous based blend composition is prepared, or in the alternative, the one or more coating formulation components may be added during the preparation of the aqueous based blend composition or components thereof, i.e. the aqueous polyolefin dispersion or the acrylic emulsion, Crosslinking Agent The aqueous base blend composition may further comprise at least one or more crosslinking agents to promote crosslinking. The aqueous base blend composition may comprise 1 to 50 percent by weight of one or more crosslinking agents, based on the total weight of the solid content of the dispersion. For example, the aqueous base blend composition may comprise from 1 to 18; or in the alternative, from 1 to 15; or in the alternative, from 1 to 12; or in the alternative, from 1 to 10; or in the alternative, from 1 to 20; or in the alternative, from 1 to 30; or in the alternative, from 1 to 40; or in the alternative, from 1 to 45; or in the alternative, from 1 to 50 percent by weight of one or more crosslinking agents, based on the total weight of the solid content of the aqueous base blend composition. In selected embodiments the crosslinking agent may be, but is not limited to, phenol-formaldehyde resins; hydroxyalkylamide resins; amino-formaldehyde resins including, but not limited to, urea-formaldehyde resins, melamine formaldehyde resins, benzoguanamine formaldehyde resins, anhydride resins; epoxy group containing resins, including, but not limited to, epoxy resins, epoxy group containing polyester or acrylic resins and blocked isocyanate resins, and combinations of two or more thereof, provided that the combinations of such crosslinkers is compatible.

Crosslinking agent may be a compound, which reacts with a reactive functional group contained in the aqueous base blend composition formulation; thereby facilitating the crosslinking between such functional groups. Such functional groups can be present in both the base polymer as well as the stabilizing agent.

For example, reactive functional groups include, but are not limited to, acid groups such as carboxylic acid groups, free or in the neutralized form, or any functional groups having another active hydrogen by another component such as alcohol groups, amino groups, epoxy groups, or the like.

Crosslinkable functional groups in the cross-linking agent are groups capable of reacting with the reactive functional group of the base polymer and/or the stabilizer. For example, a carbodiimide group, an oxazoline group, an isocyanate group, a hydroxyalkylamide group, an epoxy group, a methylol group, an aldehyde group, an acid anhydride group, a hydroxy group, an aziridinyl group or a silane group can be used in a crosslinker.

Another possibility of crosslinking acid functional groups is by use of multivalent metal ions by reaction of the aforementioned acid groups with a multivalent metal ion containing substance, such as zinc oxide.

Carboxylic acids could also be crosslinked in reactions with multifunctional olefinic unsaturated substances under catalysis of a strong acid. Multifunctional carbonates could also react with carboxylic acids to give ester linkages with liberation of carbon dioxide.

In the alternative, polyolefinic materials may be crosslinked via free radical crosslinking, initiated by addition of peroxides or via radiation, e.g., electron beam.

With respect to crosslinkable functional groups, one or more may be present in a crosslinking agent. In the alternative, two or more crosslinkable functional groups may be present in a single molecule.

The cross-linking agent having the above described crosslinkable functional group may be a waterdispersed or waterdispersible or water-soluble substance. In one embodiment, exemplary crosslinking agents include, but are not limited to, an aqueous monomeric or polymeric substance, which contains two or more oxazoline groups, carbodiimide groups, hydroxyalkylamide groups, epoxy groups, isocyanate groups, methylol groups etc. or several of these per molecule.

An exemplary oxazoline crosslinking agent is an aqueous polymer having two or more oxazoline groups in its molecules, substances can be obtained by polymerizing an oxazoline group-containing monomer and, as required, an ethylenic unsaturated monomer. Alternatively an oxazoline crosslinking agent can also be obtained by reaction between a nitrile group and an aminoethanol group, dehydration of a hydroxyalkylamide group and the like.

Crosslinking agents having two or more carbodiimide groups can be produced from diisocyanate compounds by a condensation reaction accompanied by decarboxylation reaction of a diisocyanate compound. Examples of the diisocyanate compound include, but are not limited to, 1,5-naphthylene diisocyanate, 4,4'-diphenylmethane diisocyanate, 4,4'-diphenyldimethylmethane diisocyanate, 1,4-phenylene diisocyanate, 2,4-tolylene diisocyanate, 2,6-tolylene diisocyanate, hexanemethylene diisocyanate, cyclohexane-1,4-diisocyanate, xylylene diisocyanate, isophorone diisocyanate, dicyclohexylmethane-4,4'-diisocyanate, methylcyclohexane diisocyanate, and tetramethylxylylene diisocyanate and the like. These compounds may also be used as mixtures.

Monofunctional isocyanates may be included to control the resin molecular chain length such as phenyl isocyanate, tolyl isocyanate, cyclohexylisocyanate, dimethylphenyl isocyanate, butylisocyanate, and naphthyl isocyanate are useful.

Diisocyanate substances may be partially reacted with aliphatic compounds, alicyclic compounds, or aromatic compounds having a hydroxyl group, an imino group, an amino group, a carboxyl group, a mercapto group, an epoxy group, and the like.

In the condensation reaction accompanied by decarboxylation of a diisocyanate compound, a carbodiimidization catalyst can be used. Usable as such a catalyst are, for example, phospholene oxides such as 1-phenyl-2-phospholene-1-oxide, 3-methyl-2-phospholene-1-oxide, 1-ethyl-2-phospholene-1-oxide, and 3-phospholene isomers thereof.

In order to convert a carbodiimide group-containing polymer into an aqueous polymer, a hydrophilic segment is provided in the molecular structure of the carbodiimide group-containing polymer. For example, an aqueous polymer containing a carbodiimide group can be obtained by providing a hydrophilic segment having a functional group which has reactivity with an isocyanate group. Usable as the hydrophilic segment are: quaternary ammonium salts of dialkylamino alkylamine (e.g., quaternary ammonium salts of 2-dimethylaminoethanol); quaternary salts of dialkylamino alkylamine (e.g., 3-dimethylamino-n-propylamine); alkyl sulfonic acid salts having at least one reactive hydroxyl group (e.g., sodiumhydroxypropanesulfonate); a mixture of polyethylene oxide or polyethylene oxide, whose terminal is capped with an alkoxy group, and a polypropylene oxide (e.g., polyethylene oxide whose terminal position is capped with a methoxygroup or an ethoxy group)

As an aqueous cross-linking agent containing an epoxy group, there are exemplified sorbitol polyglycidyl ether, glycerol triglycidyl ether, polyglycerol polyglycidylether trimethylolpropane triglycidyl ether, poly(ethyleneglycol) diglycidyl ether, poly(propyleneglycol) diglycidyl ether, phenol ethyleneoxide glycidyl ether, and lauryl alcohol ethyleneoxide glycidyl ether or the like. In addition to the above, mentioned as examples are: a water-soluble epoxy resin obtained by reacting a carboxy compound, which is obtained through a reaction between a polyoxyethylene polyol compound and an acid anhydride compound, and an epoxy resin having two or more epoxy groups in its molecules; and a self-emulsifiable epoxy resin composition obtained by mixing the water-soluble epoxy resin and the epoxy resin having two or more epoxy groups in its molecules. Such resins can be obtained for example under the tradenames of XZ 92533.00, XZ 92598.00 and XZ 92446.00 from The Dow Chemical Company, Midland, Mich. Examples of the anhydride compound include, but not particularly limited to, preferably aromatic anhydrides such as phthalic anhydride, trimellitic anhydride, and pyromellitic anhydride; and cyclic aliphatic anhydrides such as maleic anhydride, succinic anhdyride, tetrahydrophthalic anhydride, methyl tetrahydrophthalic anhydride, methyl nadic anhydride, alkenyl succinic anhdyride, hexahydrophthalic anhydride, and methyl hexahydrophthalic anhydride. There is no limitation on the epoxy resin having two or more epoxy groups in its molecules, and all known epoxy resins with an epoxy functionality of greater or equal to two can be used. Examples are polyglycidyl ether obtained from epichlorohydrin and a polyhydric compound such as, phenol novolac, and cresol novolac bisphenol A, bisphenol F, bisphenol S, resorcinol, hydroquinone or catechin; alkylene oxide-added bisphenol A; polyalcohols such as polypropylene glycol, 1,6-hexanediol, trimethylol propane, glycerin, cyclohexanedimethanol; and polyglycidyl ester and polyglycidyl amine of polycarboxylic acids such as adipic acid, phthalic acid, dimer acid and the like.

Aqueous cross-linking agent containing an isocyanate group are, for example: polyisocyanate mainly containing at least one member selected from the group consisting of an isocyanurate group-containing polyisocyanate, an urethodione group-containing polyisocyanate, an urethodione group/isocyanurate group containing polyisocyanate, an urethane group containing polyisocyanate, an allophanate group containing polyisocyanate, a biuret group containing polyisocyanate, a carbodiimide group containing polyisocyanate, and an uretodione group containing polyisocyanate, each of which contains 1,6-hexamethylene diisocyanate and/or isophorone diisocyanate as a raw material; and a self-emulsifiable polyisocyanate obtained by reacting a hydrophilic surfactant having at least one active hydrogen group which can react with an isocyanate group or polyethylene ether alcohol containing at least three poly-ethylene oxide units with fatty acid ester in which the sum of the number of carbons of fatty acid and a hydroxyl containing compound as raw materials is 8 or more and which has at least one active hydrogen group which can react with an isocyanate group. In addition to the above, an urethane group-containing polyisocyanate obtained by reaction between 1,6-hexamethylenediisocyanate and/or an isophorone diisocyanate and an active hydrogen group-containing compound or polyisocyanate obtained by an allophanatization reaction, carbodiimidization reaction, uretodionization reaction, and biuretization reaction of these diisocyanate compounds can be mentioned.

Examples of suitable crosslinking agents derived from aldehyde are water-dispersed or water-dispersible or water-soluble phenol formaldehyde resins, amino formaldehyde resins or combinations thereof.

Phenol formaldehyde crosslinking agents include, but are not limited to, reaction products of aldehydes with phenols. Preferred aldehdydes but not exclusive are formaldehyde and acetaldehyde. A large variety of phenols can be used such as but not exclusive phenol, cresol, p-phenylphenol, p-tert-butylphenol, p-tert-amylphenol, cyclopentylphenol, cresylic acid, bisphenol-A, bisphenol-F and the like and combinations thereof. Also acid functional phenols could be used in making phenol formaldehyde resins. The crosslinkers can be unetherified or etherified with alcohols or polyols. These phenol formaldehyde resins may be soluble or self-emulsifiable in water or can be stabilized by use of colloid stabilizers such as polyvinyl alcohol.

Amino formaldehyde crosslinking agents include, but are not limited to, reaction products of aldehydes with amino or amido group containing molecules. Exemplary aldehydes include, but are not limited to, formaldehyde and acetaldehyde. A large variety of amino or amido group containing molecules can be used such as but not exclusive urea, melamine, benzoguanamine, acetoguanamine, glycoluril and the like. Suitable amino crosslinking resins include melamine-formaldehyde, urea-formaldehyde, benzoguanamine-formaldehyde, acetoguanamine-formaldehyde, glycoluril-formaldehyde resins. Also the methylol groups of an amino formaldehyde resin can be partially or fully etherified with at least one of the groups of monohydric aliphatic alcohols such as methanol and/or n-butanol. These amino formaldehyde resins may be soluble or self-emulsifiable in water or can be stabilized by use of colloid stabilizers such as polyvinyl alcohol can be used to stabilize the amino formaldehyde dispersions.

Commercially available amino-formaldehyde resins which are water soluble or water dispersible and useful for the instant purpose include Cymel™ 301, Cymel™ 303, Cymel™ 370, and Cymel™ 373 (all being products of Cytec Surface Specialties, Brussels, Belgium). Other aldehydes used to react with the amino compound to form the resinous material are crotonic aldehyde, acrolein, or compounds which generate aldehydes, such as hexamethylene-tetramine, paraldehyde, and the like.

Another class of crosslinking agents for carboxylic acid groups are water-soluble hydroxyalkylamide crosslinkers such as Bis(N,N'-dihydroxyethyl)adipamide and the like. Such compounds are commercially available under the tradename of PRIMID™ crosslinker resins from EMS-PRIMID in Switzerland, for example PRIMID™ XL-522, PRIMID™ SF-4510 and PRIMID™ QM-1260.

The one or more crosslinking agents may be added to the aqueous polyolefin dispersion as part of the aqueous dispersion formulation process; or in the alternative, the one or more crosslinking agents may be added to the aqueous polyolefin dispersion post dispersion formulation process; or in another alternative, the one or more crosslinking agents may be added to the aqueous base blend composition, as further described herein.

Depending on the type of food and/or beverage which is to be contained in a coated container, and on required coating properties it may be beneficial to combine several crosslinkers or some crosslinkers may be more suited than others. Some crosslinkers may not be suited for all applications. Some crosslinkers may require the addition of catalysts for proper cure.

Crosslinkers will help to build thermoset networks which are indicated by higher values of MEK Double Rubs compared to an identical formulation not containing the crosslinker.

Coating Applications and Forming Coated Containers or Closure Devices

The aqueous based blend compositions of the present invention may be used, for example, in container, e.g. can, coating applications, or closure device coating applications. Such coated container devices include, but are not limited to, cans such as beverage cans, food cans; aerosol containers such as those for non-food products, e.g. hair spray, hair dye, or color spray lacquers; drums; kegs; pails; decorative tins; open trays; tubes; bottles; monoblocs; and the like. The coated closure devices include, but are not limited to, caps, lids such as thin aluminum foil based lids for yogurt and butter containers, or crown corks; closures for glass jars and bottles such as roll-on closures, vacuum closures, pilfer-proof closures, easy peel lids for can closures, and easy open end or conventional ends for cans. Cans may be 2 piece cans or 3 piece cans. Beverage cans include, but are not limited to, beer cans, carbonated soft drink cans, energy drink cans, isotonic drink cans, water cans, juice cans, tea cans, coffee cans, milk cans, and the like. Food cans, include, but are not limited to, vegetable cans, fruit cans, meat cans, soup cans, ready meal cans, fish cans, edible oil cans, sauce cans and the like. Such cans may have any shapes; for example, such can may have a cylindrical shape, cubical, spherical, semi-spherical, bottle shape, elongated cubical shape, shallow or tall shape, round or rectangular shape or any other suitable shape. The coated container devices according to the instant invention may be formed via any conventional method. For example, the coated container device may be formed via stamping, drawing, redrawing, wall ironing, bending, beading, embossing, debossing, flanging, necking, stretching, blow-stretching and any other suitable conventional method. Such methods are generally known to those having ordinary skill in the art. The aqueous based blend compositions may, for example, be applied to a metal substrate, e.g. metal sheet or metal foil, and then the coated substrate may be formed into a coated container device or a coated closure device. In the alternative, the metal substrate may be formed into a container device or a closure device, and then the container device or the closure device is coated with one or more aqueous based blend compositions to form the coated container device or coated closure device. The coating may be applied via any method; for example, via roller coating, spray coating, powder coating, dip coating, electrodeposition coating, printing, wash coating, flow coating, and/or curtain coating.

The one or more aqueous based blend compositions applied to the at least one surface of the metal substrate may be dried via any conventional drying method. Such conventional drying methods include but, are not limited to, air drying, convection oven drying, hot air drying, and/or infrared oven drying. During the drying process, crosslinking of one or more base polymers, stabilizing agents, or combinations thereof, involving one or more the crosslinking agents, may occur. Additional cure might occur by radiation cure, e.g. electron-beam cure. The one or more aqueous based blend compositions applied to the at least one surface of the metal substrate may be dried at any temperature. The one or more aqueous based blend compositions applied to the at least one surface of the metal substrate may be dried at a temperature in the range of about 60° F. (15.5° C.) to about 700° F. (371° C.) for a period of less than about 40 minutes, for example, less than 20 minutes, or less than 10 minutes, or less than 5 minutes, or less than 2 minutes, or less than 1 minute, or less than 20 seconds. All individual values and subranges from about 60° F. (15.5° C.) to about 700° F. (371° C.) are included herein and disclosed herein; for example, the one or more aqueous based blend compositions applied to the at least one surface of the metal substrate may be dried at a temperature in the range of about 60° F. (15.5° C.) to about 500° F. (260° C.) for a period of less than about 40 minutes, for example, less than 20 minutes, or less than 10 minutes, or less than 5 minutes, or less than 2 minutes, or less than 1 minute, or in the alternative, the one or more aqueous based blend compositions applied to the at least one surface of the metal substrate may be dried at a temperature in the range of about 60° F. (15.5° C.) to about 450° F. (232.2° C.) for a period of less than about 40 minutes, for example, less than 20 minutes, or less than 10 minutes, or less than 5 minutes, or less than 2 minutes, or less than 1 minute.

The coated metal substrate may further be coated with one or more conventional coating compositions, or it may further be laminated to one or more other layers. Such conventional coating compositions are generally known to person of ordinary skill in the art, and they may include, but are not limited to, epoxy resin coating compositions, acrylate based coating compositions, and polyester based coating compositions. The lamination process is generally known, and exemplary lamination layers may include, but are not limited to, polyester laminates, polyolefin based laminates such as polypropylene laminates.

The one or more aqueous based blend compositions applied to at least one surface of a metal substrate may have a cross cut adhesion rating of at least 3B; for example, 5B, measured according to ASTM-D 3359-08. The one or more aqueous based blend compositions applied to at least one surface of a metal substrate may have a methyl ethyl ketone (MEK) double rub rating of at least 10. The one or more aqueous based blend compositions applied to at least one surface of a metal substrate may have a wedge bend pass rating of at least 90 percent, measured via a Gardner "COVERALL" Bend Tester IG 1125.

EXAMPLES

The following examples illustrate the present invention but are not intended to limit the scope of the invention.

Preparation of Aqueous Polyolefin Dispersion A (POD A)

Aqueous polyolefin dispersion A (POD A) was prepared according to the following procedures based on the formulation components listed in Table I. PP 6D43, polypropylene having a melt index of approximately in the range of 32 to 38 g/10 minutes (ASTM D 1238, 230° C./2.16 Kg), available from The Dow Chemical Company, as the base polymer, and PRIMACOR™ 5980i (CAS No. 9010-77-9), ethylene acrylic-acid copolymer having acrylic acid content of approximately in the range of 19.5 to 21.5 weight percent and a melt index of approximately 300 g/10 minutes (ASTM D 1238, 190° C./2.16 Kg), available from The Dow Chemical Company, as a first stabilizing agent, and Licocene 6452 maleic anhydride grafted polypropylene having a softening point of approximately 130 to 150° C., available from Clariant Corporation, as a second stabilizing agent, were fed into a 25 mm diameter twin screw extruder by means of a controlled rate feeder where they were forwarded and melted. The extruder temperature profile was ramped up to approximately 160° C. prior to the addition of the initial water and DMEA, dimethylethanolamine (CAS No. 108-01-0), as the neutralizing agent, and subsequently, it was cooled back down to a temperature below 100° C. by the end of the extruder after the dilution water was added. The extruder speed was approximately 1200 rpm Amine neutralizing agent and water were mixed together and fed to the extruder at the initial water introduction point. The dilution water was fed via a second pump, and it was introduced into the dilution zone of the extruder. The initial water and dilution water streams were optionally preheated to the extruder temperature. At the extruder outlet, a back-pressure regulator was used to adjust to a suitable pressure inside the extruder barrel to reduce steam formation at the operating temperature. The resulting dispersions were cooled and filtered through a 200 micron filter.

TABLE 1

| Aqueous Dispersion | Base Polymer (g/min) | First Stabilizing Agent (g/min) | Second Stabilizing Agent (g/min) | Neutralizing Agent (ml/min) | Initial Water Rate (ml/min) | Dilution Water Rate (ml/min) | Average Particle Size Diameter (microns) |
|---|---|---|---|---|---|---|---|
| POD A | 6D43 polypropylene (212) | PRIMACOR™ 5980i (68) | LICOCENE™ 6452 (23) | DMEA (31) | 70 | 240 | 1.0 |

Preparation of Acrylic Emulsions (AE) 1-10
Preparation of AE 1

A monomer emulsion was prepared by combining 527.3 g butyl acrylate, 511.5 g methyl methacrylate, 15.8 g methacrylic acid, 301.5 g deionized (DI) water, 0.88 g ammonium hydroxide, and 6.05 g of a 70% percent by weight solution of dodecylbenzene sulfonic acid in isopropanol, and emulsifying with stirring. 2500 g of DI water was charged to a five liter multi-neck flask fitted with mechanical stirring and then heated to 85° C. under a nitrogen atmosphere. Next, 3.05 g of a 70% percent by weight solution of dodecylbenzene sulfonic acid in isopropanol, and 0.44 g ammonium hydroxide were added to the flask with stirring. To the stirred flask contents was added 33.75 g of the monomer emulsion, followed by 3.45 g sodium carbonate in 18.75 g DI water, followed by 2.65 g APS in 15.0 g DI water. The total addition time for the monomer emulsion and a cofeed of 0.45 g APS in 36.75 g DI water was 120 minutes. Reactor temperature was maintained at 80° C. to 85° C. throughout the addition of the monomer mixture. Next, 18.75 g DI water was used to rinse the emulsion feed line to the reactor. The contents of the reactor were cooled to 70° C. 3.375 g of a 0.15% ferrous sulfate solution, 0.265 g t-butyl hydroperoxide, and 0.15 g D-isoascorbic acid in aqueous solutions were then added to the flask, followed by an additional 0.265 g t-butyl hydroperoxide and 0.15 g D-isoascorbic acid in aqueous solutions. The contents of the reactor were cooled to 40° C. The contents of the flask were neutralized to a pH of 7.6 with dimethylethanolamine Properties of AE 1 were measured and reported in Table 2.

Preparation of AE 2

A monomer emulsion was prepared by combining 527.3 g butyl acrylate, 511.5 g methyl methacrylate, 15.8 g methacrylic acid, 301.5 g DI water, 1.17 g ammonium hydroxide and 8.10 g of a 70% percent by weight solution of dodecylbenzene sulfonic acid in isopropanol, and emulsifying with stirring. 2500 g of DI water was charged to a five liter multi-neck flask fitted with mechanical stirring and then heated to 85° C. under a nitrogen atmosphere. Next, 1.0 g of a 70% percent by weight solution of dodecylbenzene sulfonic acid in isopropanol, and 0.15 g ammonium hydroxide were added to the flask with stirring. To the stirred flask contents was added 33.75 g of the monomer emulsion, followed by 3.45 g sodium carbonate in 18.75 g DI water, followed by 2.65 g APS in 15.0 g DI water. The total addition time for the monomer emulsion and a cofeed of 0.45 g APS in 36.75 g DI water was 120 minutes. Reactor temperature was maintained at 80° C. to 85° C. throughout the addition of the monomer mixture. Next, 18.75 g DI water was used to rinse the emulsion feed line to the reactor. The contents of the reactor were cooled to 70° C. 3.375 g of a 0.15% ferrous sulfate solution, 0.265 g t-butyl hydroperoxide, and 0.15 g D-isoascorbic acid in aqueous solutions were then added to the flask, followed by an additional 0.265 g t-butyl hydroperoxide and 0.15 g D-isoascorbic acid in aqueous solutions. The contents of the reactor were cooled to 40° C. The contents of the flask were neutralized to a pH of 7.9 with dimethylethanolamine Properties of AE 2 were measured and reported in Table 2.

Preparation of AE 3

A monomer emulsion was prepared by combining 1000.0 g butyl acrylate, 970.0 g methyl methacrylate, 30.0 g methacrylic acid, 480.0 g DI water, 2.40 g ammonium hydroxide, and 12.7 g of dodecylbenzene sulfonic acid, and emulsifying with stirring. 990 g of DI water was charged to a five liter multi-neck flask fitted with mechanical stirring and then heated to 88° C. under a nitrogen atmosphere. Next, 17.6 g ammonium hydroxide in 30.0 g DI water, followed by 8.8 g APS in 40.0 g DI water were added to the flask with stirring. To the stirred flask contents was added 250.0 g of an acrylic seed polymer with particle size 62 nm. The total addition time for the monomer emulsion was 120 minutes. Reactor temperature was maintained at 80° C. to 86° C. throughout the addition of the monomer mixture. Next, 100.0 g DI water was used to rinse the emulsion feed line to the reactor. The contents of the reactor were cooled to 65° C. 10.0 g of a 0.15% ferrous sulfate solution, 1.0 g versene solution, 1.7 g t-butyl hydroperoxide, and 0.75 g D-isoascorbic acid in aqueous solutions were then added to the flask, followed by an additional 1.7 g t-butyl hydroperoxide and 0.75 g D-isoascorbic acid in aqueous solutions. The contents of the reactor were cooled to 40° C. The contents of the flask were neutralized to a pH of 8.4 with dimethylethanolamine Properties of AE 3 were measured and reported in Table 2.

Preparation of AE 4

A monomer emulsion was prepared by combining 1000.0 g butyl acrylate, 970.0 g methyl methacrylate, 30.0 g methacrylic acid, 480.0 g DI water, 2.40 g ammonium hydroxide, and 12.7 g of dodecylbenzene sulfonic acid, and emulsifying with stirring. 990 g of DI water was charged to a five liter multi-neck flask fitted with mechanical stirring and then heated to 88° C. under a nitrogen atmosphere. Next, 17.6 g ammonium hydroxide in 30.0 g DI water, followed by 8.8 g APS in 40.0 g DI water were added to the flask with stirring. To the stirred flask contents was added 62.5 g of an acrylic seed polymer with particle size 62 nm. The total addition time for the monomer emulsion was 120 minutes. Reactor temperature was maintained at 80° C. to 86° C. throughout the addition of the monomer mixture. 100.0 g DI water was used to rinse the emulsion feed line to the reactor. The contents of the reactor were cooled to 65° C. Next 10.0 g of a 0.15% ferrous sulfate solution, 1.0 g versene solution, 1.7 g t-butyl hydroperoxide, and 0.75 g D-isoascorbic acid in aqueous solutions were then added to the flask, followed by an additional 1.7 g t-butyl hydroperoxide and 0.75 g D-isoascorbic acid in aqueous solutions. The contents of the reactor were cooled to 40° C. The contents of the flask were neutralized to a pH of 8.1 with dimethylethanolamine Properties of AE 4 were measured and reported in Table 2.

Preparation of AE 5

A monomer emulsion was prepared by combining 1000.0 g butyl acrylate, 970.0 g methyl methacrylate, 30.0 g methacrylic acid, 480.0 g DI water, 2.40 g ammonium hydroxide, and 12.7 g of dodecylbenzene sulfonic acid, and emulsifying with stirring. 990 g of DI water was charged to a five liter multi-neck flask fitted with mechanical stirring and then heated to 88° C. under a nitrogen atmosphere. Next, 17.6 g ammonium hydroxide in 30.0 g DI water, followed by 8.8 g APS in 40.0 g DI water were added to the flask with stirring. To the stirred flask contents was added 15.0 g of an acrylic seed polymer with particle size 62 nm. The total addition time for the monomer emulsion was 120 minutes. Reactor temperature was maintained at 80° C. to 86° C. throughout the addition of the monomer mixture. Next, 100.0 g DI water was used to rinse the emulsion feed line to the reactor. The contents of the reactor were cooled to 65° C. 10.0 g of a 0.15% ferrous sulfate solution, 1.0 g versene solution, 1.7 g t-butyl hydroperoxide, and 0.75 g D-isoascorbic acid in aqueous solutions were then added to the flask, followed by an additional 1.7 g t-butyl hydroperoxide and 0.75 g D-isoascorbic acid in aqueous solutions. The contents of the reactor were cooled to 40° C. The contents of the flask were neutralized to a pH of 8.4 with dimethylethanolamine Properties of AE 5 were measured and reported in Table 2.

Preparation of AE 6

A monomer emulsion was prepared by combining 900.0 g 2-ethyl hexyl acrylate, 1070.0 g methyl methacrylate, 30.0 g methacrylic acid, 480.0 g DI water, 2.40 g ammonium hydroxide, and 12.7 g of dodecylbenzene sulfonic acid, and emulsifying with stirring. 990 g of DI water was charged to a five liter multi-neck flask fitted with mechanical stirring and then heated to 88° C. under a nitrogen atmosphere. Next, 17.6 g ammonium hydroxide in 30.0 g DI water, followed by 8.8 g APS in 40.0 g DI water were added to the flask with stirring. To the stirred flask contents was added 62.5 g of an acrylic seed polymer with particle size 62 nm. The total addition time for the monomer emulsion was 120 minutes. Reactor temperature was maintained at 80° C. to 86° C. throughout the addition of the monomer mixture. Next, 100.0 g DI water was used to rinse the emulsion feed line to the reactor. The contents of the reactor were cooled to 65° C. 10.0 g of a 0.15% ferrous sulfate solution, 1.0 g versene solution, 1.7 g t-butyl hydroperoxide, and 0.75 g D-isoascorbic acid in aqueous solutions were then added to the flask, followed by an additional 1.7 g t-butyl hydroperoxide and 0.75 g D-isoascorbic acid in aqueous solutions. The contents of the reactor were cooled to 40° C. The contents of the flask were neutralized to a pH of 8.2 with dimethylethanolamine Properties of AE 6 were measured and reported in Table 2.

Preparation of AE 7

A monomer emulsion was prepared by combining 765.0 g 2-ethyl hexyl acrylate, 909.5 g methyl methacrylate, 25.5 g methacrylic acid, 3.4 g n-dodecyl mercaptan, 408.0 g DI water, 2.0 g ammonium hydroxide, and 10.8 g of dodecylbenzene sulfonic acid, and emulsifying with stirring. 1350 g of DI water was charged to a five liter multi-neck flask fitted with mechanical stirring and then heated to 88° C. under a nitrogen atmosphere. Next, 15.0 g ammonium hydroxide in 25.5 g DI water, followed by 7.5 g APS in 34.0 g DI water were added to the flask with stirring. To the stirred flask contents was added 43 g of an acrylic seed polymer with particle size 62 nm. The total addition time for the monomer emulsion was 120 minutes. Reactor temperature was maintained at 80° C. to 86° C. throughout the addition of the monomer mixture. Next, 85.0 g DI water was used to rinse the emulsion feed line to the reactor. The contents of the reactor were cooled to 65° C. 8.5 g of a 0.15% ferrous sulfate solution, 0.85 g versene solution, 1.45 g t-butyl hydroperoxide, and 0.64 g D-isoascorbic acid in aqueous solutions were then added to the flask, followed by an additional 1.45 g t-butyl hydroperoxide and 0.64 g D-isoascorbic acid in aqueous solutions. The contents of the reactor were cooled to 40° C. The contents of the flask were neutralized to a pH of 8.0 with dimethylethanolamine Properties of AE 7 were measured and reported in Table 2.

Preparation of AE 8

A monomer emulsion was prepared by combining 765.0 g 2-ethyl hexyl acrylate, 909.5 g methyl methacrylate, 25.5 g methacrylic acid, 12.75 g n-dodecyl mercaptan, 408.0 g DI water, 2.0 g ammonium hydroxide, and 10.8 g of dodecylbenzene sulfonic acid, and emulsifying with stirring. Next, 1350 g of DI water was charged to a five liter multi-neck flask fitted with mechanical stirring and then heated to 88° C. under a nitrogen atmosphere. 15.0 g ammonium hydroxide in 25.5 g DI water, followed by 7.5 g APS in 34.0 g DI water were added to the flask with stirring. To the stirred flask contents was added 43 g of an acrylic seed polymer with particle size 62 nm. The total addition time for the monomer emulsion was 120 minutes. Reactor temperature was maintained at 80° C. to 86° C. throughout the addition of the monomer mixture. Next, 85.0 g DI water was used to rinse the emulsion feed line to the reactor. The contents of the reactor were cooled to 65° C. 8.5 g of a 0.15% ferrous sulfate solution, 0.85 g versene solution, 1.45 g t-butyl hydroperoxide, and 0.64 g D-isoascorbic acid in aqueous solutions were then added to the flask, followed by an additional 1.45 g t-butyl hydroperoxide and 0.64 g D-isoascorbic acid in aqueous solutions. The contents of the reactor were cooled to 40° C. The contents of the flask were neutralized to a pH of 8.3 with dimethylethanolamine Properties of AE 8 were measured and reported in Table 2.

Preparation of AE 9

A monomer emulsion was prepared by combining 157.5 g butyl acrylate, 720 g methyl methacrylate, 600 g lauryl methacrylate, 22.5 g methacrylic acid, 500 g DI water, 1.2 g ammonium hydroxide, and 7.5 g of a 70% percent by weight solution of dodecylbenzene sulfonic acid in isopropanol, and emulsifying with stirring. 600 g of DI water and 30 g of 50% cyclodextrin solution were charged to a five liter multi-neck flask fitted with mechanical stirring and then heated to 85° C. under a nitrogen atmosphere. Next, 9.6 g of a 70% percent by weight solution of dodecylbenzene sulfonic acid in isopropanol, 1.54 g ammonium hydroxide, and 5 g DI water were added to the flask with stirring. To the stirred flask contents was added 82.35 g of the monomer emulsion, followed by 5.3 g sodium carbonate in 20 g DI water, followed by 5.3 g APS in 20 g DI water. The total addition time for the monomer emulsion and a cofeed of 1 g APS in 120 g DI water was 120 minutes. Reactor temperature was maintained at 80° C. to 85° C. throughout the addition of the monomer mixture. Next, 50 g DI water was used to rinse the emulsion feed line to the reactor. The contents of the reactor were cooled to 75° C. Next, 5 g of a 0.15% ferrous sulfate solution, 3.7 g versene solution, 0.64 g t-butyl hydroperoxide, and 0.34 g D-isoascorbic acid in aqueous solutions were added to the flask. The contents of the reactor were cooled to 65° C. 0.64 g t-butyl hydroperoxide and 0.34 g D-isoascorbic acid in aqueous solutions were then added to the flask. The contents of the reactor were cooled to 40° C. The contents of the flask were neutralized to a pH of 7.8 with dimethylethanolamine Properties of AE 9 were measured and reported in Table 2.

Preparation of AE 10

A monomer emulsion was prepared by combining 157.5 g butyl acrylate, 720 g methyl methacrylate, 600 g lauryl methacrylate, 22.5 g methacrylic acid, 4.5 g n-dodecyl mercaptan, 500 g DI water, 1.2 g ammonium hydroxide, and 7.5 g of a 70% percent by weight solution of dodecylbenzene sulfonic acid in isopropanol, and emulsifying with stirring. 600 g of DI water and 30 g of 50% cyclodextrin solution were charged to a five liter multi-neck flask fitted with mechanical stirring and then heated to 85° C. under a nitrogen atmosphere. Next, 9.6 g of a 70% percent by weight solution of dodecylbenzene sulfonic acid in isopropanol, 1.54 g ammonium hydroxide, and 5 g DI water were added to the flask with stirring. To the stirred flask contents was added 82.35 g of the monomer emulsion, followed by 5.3 g sodium carbonate in 20 g DI water, followed by 5.3 g APS in 20 g DI water. The total addition time for the monomer emulsion and a cofeed of 1 g APS in 120 g DI water was 120 minutes. Reactor temperature was maintained at 80° C. to 85° C. throughout the addition of the monomer mixture. Next, 50 g DI water was used to rinse the emulsion feed line to the reactor. The contents of the reactor were cooled to 75° C. 5 g of a 0.15% ferrous sulfate solution, 3.7 g versene solution, 0.64 g t-butyl hydroperoxide, and 0.34 g D-isoascorbic acid in aqueous solutions were then added to the flask. The contents of the reactor were cooled to 65° C.

Next, 0.64 g t-butyl hydroperoxide and 0.34 g D-isoascorbic acid in aqueous solutions were added to the flask. The contents of the reactor were cooled to 40° C. The contents of the flask were neutralized to a pH of 8.1 with dimethylethanolamine Properties of AE 10 were measured and reported in Table 2.

TABLE 2

| Acrylic Emulsion Number | Composition W% of monomer | Particle Size nm | Mw | % Solids | pH |
|---|---|---|---|---|---|
| AE 1 | 50 BA/48.5 MMA/1.5 MAA | 78 | — | 26.3% | 7.6 |
| AE 2 | 50 BA/48.5 MMA/1.5 MAA | 115 | — | 25.8% | 7.9 |
| AE 3 | 50 BA/48.5 MMA/1.5 MAA | 160 | — | 51.1% | 8.4 |
| AE 4 | 50 BA/48.5 MMA/1.5 MAA | 250 | 649,000 | 52.3% | 8.1 |
| AE 5 | 50 BA/48.5 MMA/1.5 MAA | 375 | — | 53.1% | 8.4 |
| AE 6 | 45.0 2EHA/53.5MMA/1.5 MAA | 242 | 537,000 | 51.7% | 8.2 |
| AE 7 | 45.0 2EHA/53.5MMA/1.5 MAA/0.20 nDDM | 269 | 194,000 | 44.9% | 8.0 |
| AE 8 | 45.0 2EHA/53.5MMA/1.5 MAA/0.75 nDDM | 264 | 36,000 | 45.5% | 8.3 |
| AE 9 | 10.5 BA/40 LMA/48 MMA/1.5 MAA | 109 | 341,290 | 50.9% | 7.8 |
| AE 10 | 10.5 BA/40 LMA/48 MMA/1.5 MAA/0.3 nDDM | 109 | 82,543 | 51.3% | 8.1 |

BA: Butyl Acrylate;
MMA: Methyl methacrylate
nDDM: n-dodecyl mercaptan
2EHA: 2-ethyl hexylacrylate
MAA: methacrylic acid Preparation of Coating Compositions 1-19

Acrylic emulsions (A1-10) were added to the aqueous polyolefin dispersion A ("POD A") under mixing conditions in a lab mixer at medium shear to form aqueous blend compositions 1-19. After mixing the aqueous based blend compositions 1-19 for approximately 5 minutes, basic (pH 9-10) water followed by a solvent blend of butanol/butyl cellosolve (1:1 ratio) was added slowly to the aqueous based blend compositions 1-19 under medium shear, and further mixed for approximately 5 additional minutes. The solvent blend also contained Irganox™ 1010, an antioxidant used to protect the polyolefin dispersion at high cure temperatures. All of the mixing was completed in a 4 oz. wide mouth glass jar using a Teflon paddle blade stirrer. Basic water included 787 g deionized water and 2.36 g dimethylethanolamine (DMEA), and a pH of approximately 9-10. The solvent blend included 152 g butanol, 152 g butyl cellosolve, and 0.14 g Irganox 1010. Coating Composition formulation components are reported in Table 3.

TABLE 3

| Coating Formulation | POD Amount (g) | Acrylic Emulsion | Acrylic Amount (g) | Water Amount (g) | Solvent Blend Amount (g) | Total Formulation Amount (g) | Total Formulaion % Solids |
|---|---|---|---|---|---|---|---|
| Coating Composition 1 | 15.00 | AE 1 | 18.17 | 17.61 | 8.96 | 59.75 | 20 |
| Coating Composition 2 | 15.00 | AE 2 | 18.53 | 17.26 | 8.96 | 59.75 | 20 |
| Coating Composition 3 | 15.00 | AE 3 | 9.36 | 26.43 | 8.96 | 59.75 | 20 |
| Coating Composition 4 | 15.00 | AE 4 | 9.14 | 26.65 | 8.96 | 59.75 | 20 |
| Coating Composition 5 | 15.00 | AE 5 | 9.01 | 26.78 | 8.96 | 59.75 | 20 |
| Coating Composition 6 | 15.00 | None | 0.00 | 15.47 | 5.38 | 35.85 | 20 |
| Coating Composition 7 | 0.00 | AE 4 | 25.00 | 30.57 | 9.81 | 65.38 | 20 |
| Coating Composition 8 | 15.00 | AE 6 | 9.25 | 26.53 | 8.96 | 59.75 | 20 |
| Coating Composition 9 | 15.00 | AE 7 | 10.65 | 25.14 | 8.96 | 59.75 | 20 |
| Coating Composition 10 | 15.00 | AE 8 | 10.50 | 25.29 | 8.96 | 59.75 | 20 |
| Coating Composition 11 | 20.75 | AE 4 | 3.88 | 26.15 | 8.96 | 59.75 | 20 |
| Coating Composition 12 | 18.75 | AE 4 | 5.71 | 26.33 | 8.96 | 59.75 | 20 |

TABLE 3-continued

| Coating Formulation | POD Amount (g) | Acrylic Emulsion | Acrylic Amount (g) | Water Amount (g) | Solvent Blend Amount (g) | Total Formulation Amount (g) | Total Formulaion % Solids |
|---|---|---|---|---|---|---|---|
| Coating Composition 13 | 16.50 | AE 4 | 7.77 | 26.52 | 8.96 | 59.75 | 20 |
| Coating Composition 14 | 15.00 | AE 4 | 9.14 | 26.65 | 8.96 | 59.75 | 20 |
| Coating Composition 15 | 15.00 | AE 9 | 9.39 | 26.40 | 8.96 | 59.75 | 20 |
| Coating Composition 16 | 15.00 | AE 10 | 9.32 | 26.47 | 8.96 | 59.75 | 20 |
| Coating Composition 17 | 21.25 | AE 4 | 3.43 | 26.11 | 8.96 | 59.75 | 20 |
| Coating Composition 18 | 16.25 | AE 4 | 8.00 | 26.54 | 8.96 | 59.75 | 20 |
| Coating Composition 19 | 12.50 | AE 4 | 11.42 | 26.86 | 8.96 | 59.74 | 20 |

Room Temperature Stability Test

One day after the preparation of the blend compositions 1-19, blend composition samples were evaluated for room temperature stability in the jar. If blend composition samples was homogeneous with no settling, clumping, gelation, or phase separation, the blend composition samples was deemed stable. If there was incompatibility present as settling, clumping, gelation, or phase separation, the blend composition samples was considered unstable. Blend compositions containing an acrylic emulsion with a particle size>115 nm appeared to be more stable as shown in table 4.

TABLE 4

| Blend Composition # | Particle size of AE | Room temperature shelf stability of blend composition |
|---|---|---|
| Blend Composition 1 | 78 | Unstable |
| Blend Composition 2 | 115 | Unstable |
| Blend Composition 3 | 160 | Stable |
| Blend Composition 4 | 250 | Stable |
| Blend Composition 5 | 375 | Stable |

Coating Application

Aluminum panels (can stock clean aluminum measuring 0.009×4"×12" from All Foils), were cleaned with acetone, and then dried. About 3 grams of each inventive coating formulations 1-19 was applied individually to the aluminum panel via a 3.6 mil #36 wirewound drawdown bar thereby coating one surface of the aluminum panel. Coating application was completed approximately one hour after respective coating composition 1-19 was prepared. Subsequently, the panel was placed into a convection oven on a mass of solid aluminum plate to be cured for 130 seconds at 400° F. The coated aluminum panels were tested for coating thickness, cross cut adhesion before sterilization (retort), cross cut adhesion and blush after sterilization (retort) according to the procedures described below. The results are reported in Tables 5-6, reporting effects of MW and acrylic level on retort resistance, respectively.

TABLE 5

| Coating Composition | Mw of Acrylic | Coating Thickness (microns) | Appearance (Blush) after Lactic acid retort | Adhesion after lactic acid retort | Appearance (Blush) after water retort | Adhesion after water retort |
|---|---|---|---|---|---|---|
| 9 | 194,000 | 10.9 | 2 | 0B | 1 | 5B |
| 10 | 36,000 | 10.0 | 2 | 0B | 2 | 0B |
| 16 | 82,543 | 5.0 | 1 | 0B | 1 | 5B |
| 15 | 341,290 | 9.1 | 3 | 5B | 3 | 5B |
| 8 | 537,000 | 11.7 | 2 | 3B | 1 | 5B |

TABLE 6

| Coating Composition # | Level of AE 4 (W % Solid) | Coating Thickness (microns) | Appearance (Blush) after Lactic acid retort | Adhesion after lactic acid retort | Appearance (Blush) after water retort | Adhesion after water retort |
|---|---|---|---|---|---|---|
| 6 | 0 | 11.3 | 5 | 0B | 4 | 0B |
| 7 | 100 | 10.2 | Film loss - could not rate | Film loss - could not rate | 1 | Film peeled off when cut |
| 17 | 15 | 9.7 | 4 | 0B | 3 with blisters | 0B |
| 11 | 17 | 9.7 | 3 | 0B | 3 | 0B |
| 12 | 25 | 10.1 | 2 | 3B | 2 | 0B |
| 13 | 34 | 9.2 | 4 | 4B | 2 | 4B |
| 18 | 35 | 9.4 | 4 | 5B | 3 | 5B |
| 14 | 40 | 10.4 | 4 | 5B | 2 | 5B |
| 19 | 50 | 9.4 | 4 | 5B | 3 | 5B |

Test Methods

Test methods include the following:

Cross-Cut Adhesion Before Retort (Dry Adhesion)

Cross-cut adhesion is measured according to ASTM-D 3359-02, Measuring adhesion by tape test, Method B., using a fresh snap off razor blade and a stainless steel template to score eleven lines. This method provides the procedure for assessing the adhesion of coating films to metallic substrates by applying and removing a tape (grade: 3M 410M double coated paper tape) over the cuts made in the film. Place the center of a piece of tape over the grid and in the area of the grid smooth into place by a finger. To ensure good contact with the film rub the tape firmly with a tongue depressor. Within 90±30 seconds of application, remove the tape by seizing the free end and rapidly (not jerked) pulling it off at as close to an angle of 180 degrees as possible. Inspect the grid area for removal of coating from the substrate using the illuminated magnifier. Rate the adhesion in accordance with the scale in table A.

Cross Cut Adhesion after Retort (Wet Adhesion)

In addition to testing cross cut adhesion on the dry panels prior to water retort exposure, a cross-cut adhesion test is performed within an hour of being removed from the autoclave and rated for adhesion as described in the cross cut adhesion section. The adhesion is rated in accordance with the scale given in table A.

TABLE A

| | Cross-cut Adhesion Rating Scale |
|---|---|
| 5B | The edges of the cuts are completely smooth; none of the squares of the lattice is detached. |
| 4B | Small flakes of the coating are detached at intersections; less than 5% of the area is affected. |
| 3B | Small flakes of the coating are detached along the edges and at intersections of cuts. The area affected is 5-15% of the lattice. |
| 2B | The coating has flaked along the edges and on parts of the squares. The area affected is 15-35% of the lattice. |
| 1B | The coating has flaked along the edges of cuts in large ribbons and whole squares have detached. The area affected is 35-65% of the lattice. |
| 0B | Flaking and detachment is worse than 1B |

Retort Resistance (Water)

The coated panels were immersed in water in individual pressurizable glass beakers that were contained in a secondary container tray, and placed into a Tuttnauer 10" dia×18" Deep Chamber Autoclave model 1 Z-TUT-EZ-10 where they were retorted at 129° C. for 30 minutes. The panels were removed, rinsed with water, and dried. The coating appearance was then rated on a scale of 1-5 (5—best, 1—worst) as determined by blush (a whitish appearance of the coating) as shown in table B.

Retort Resistance (Lactic Acid)

The coated panels were immersed in 2% lactic acid in individual pressurizable glass beakers that were contained in a secondary container tray, and placed into a Tuttnauer 10" dia×18" Deep Chamber Autoclave model 1 Z-TUT-EZ-10 where they were retorted at 121° C. for 30 minutes. The panels were removed, rinsed with water, and dried. The coating appearance was then rated on a scale of 1-5 (5—best, 1—worst) as determined by blush (a whitish appearance of the coating) as shown in table B.

TABLE B

| Coating Appearance after Retort Rating Scale | |
|---|---|
| 5 | No Blush |
| 4 | Very Slight blush |
| 3 | Slight blush |
| 2 | Blush |
| 1 | Strong Blush |

Coating Thickness

Coating thickness was measured according to ASTM-D 1186-93, Non-destructive measurement of dry film thickness of non magnetic coatings applied to a non-ferrous base, using a Byko-Test 8500 coating thickness gauge. The standard aluminum panel without any coating was used for calibration. The thickness of the coating of the coated panels was reported as the range of 10 measurements, wherein each measurement of the thickness of the coating of the coated panels was measured using a probe for non-ferrous materials relative to the thickness of the coating of the standard panel, i.e. zero. The measured thickness was reported in microns.

The present invention may be embodied in other forms without departing from the spirit and the essential attributes thereof, and, accordingly, reference should be made to the appended claims, rather than to the foregoing specification, as indicating the scope of the invention.

We claim:

1. An aqueous based blend composition comprising:
an aqueous polyolefin dispersion comprising the melt blending product of one or more homopolymers and/or copolymers of propylene and one or more stabilizing agents selected from the group of polar polyolefins in the presence of water and optionally one or more neutralizing agents, wherein the polyolefin dispersion has an average volume particle size diameter in the range of from 400 to 1500 nm, and a pH range from 8 to 11; and an acrylic emulsion comprising acrylic solids having an average weight particle size diameter in the range of from 160 to 450 nm; an acid level in the range of from 0.25 to 5 percent by weight of acid monomers based on the weight of the acrylic monomer, and a weight average molecular weight in the range of from 341,000 to 600,000 g/mole, and a glass transition temperature (Tg) in the range of from 7 to 100° C., and wherein said acrylic emulsion has a pH in the range of from 7 to 9;

wherein said aqueous based blend composition has a solid content in the range of from 15 to 70 percent by weight of solids, based on the weight of the aqueous based blend composition, wherein said solid content of said blend composition comprises from 20 to 95 percent by weight of the one or more homopolymers and/or copolymers of propylene, based on the weight of the solid content of the aqueous based blend composition and from 34 to 50 percent by weight of the acrylic solids, based on the weight of the solid content of the aqueous based blend composition, and a pH in the range of from 7 to 11.

2. A film obtained from the aqueous based blend composition of claim 1.

3. The film of claim 2, wherein said film has a thickness in the range of from 1 to 20 μm.

4. A multilayer film comprising one or more films according to claim 2.

5. A container device comprising a substrate and the film of claim 2 associated with at least one surface of said substrate.

* * * * *